US008192278B2

(12) United States Patent
Yoshizawa

(10) Patent No.: US 8,192,278 B2
(45) Date of Patent: Jun. 5, 2012

(54) GAMING MACHINE AND PLAYING METHOD THEREOF, WHICH QUALIFIES PLAYER TO JOIN SPECIAL GAME THROUGH CHANCE GAME RUN AT THE SAME TIME BASE GAME IS RUN

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 913 days.

(21) Appl. No.: 12/233,042

(22) Filed: Sep. 18, 2008

(65) Prior Publication Data

US 2009/0239654 A1 Sep. 24, 2009

Related U.S. Application Data

(60) Provisional application No. 61/038,622, filed on Mar. 21, 2008.

(51) Int. Cl.
*A63F 13/00* (2006.01)

(52) U.S. Cl. ................ 463/25; 463/16; 463/20; 463/23; 463/29; 273/138.1; 273/139

(58) Field of Classification Search .......... 463/1, 10–13, 463/16–21, 23, 25–27, 29–34; 273/138.1, 273/138.2, 139, 141 A, 142 B, 142 C, 142 J, 273/148 R, 429–432
See application file for complete search history.

(56) References Cited

U.S. PATENT DOCUMENTS

| | | | | |
|---|---|---|---|---|
| 4,283,709 | A | 8/1981 | Lucero et al. | |
| 5,820,459 | A | 10/1998 | Acres et al. | |
| 6,003,013 | A * | 12/1999 | Boushy et al. | 705/7.33 |
| 7,500,913 | B2 * | 3/2009 | Baerlocher | 463/16 |
| 7,513,828 | B2 * | 4/2009 | Nguyen et al. | 463/26 |
| 7,597,621 | B2 * | 10/2009 | Baerlocher | 463/28 |
| 7,758,416 | B2 * | 7/2010 | Randall | 463/20 |
| 7,976,379 | B2 * | 7/2011 | Baerlocher | 463/20 |
| 8,021,230 | B2 * | 9/2011 | Baerlocher et al. | 463/25 |
| 8,109,821 | B2 * | 2/2012 | Kovacs et al. | 463/16 |
| 2008/0020817 | A1 * | 1/2008 | Kaminkow et al. | 463/16 |
| 2008/0113765 | A1 * | 5/2008 | DeWaal | 463/25 |
| 2009/0042652 | A1 * | 2/2009 | Baerlocher et al. | 463/42 |
| 2009/0104977 | A1 * | 4/2009 | Zielinski | 463/25 |
| 2009/0124364 | A1 * | 5/2009 | Cuddy et al. | 463/27 |

* cited by examiner

*Primary Examiner* — Arthur O. Hall
(74) *Attorney, Agent, or Firm* — Lexyoume IP Group, PLLC

(57) ABSTRACT

A gaming terminal runs a base game and a special game simultaneously; awards a payout according to a result of the base game; awards the number of chance flags according to a result of the chance game; accumulatively stores, in a terminal storage unit, the number of chance flags in association with ID data and a PIN code; when ID data is newly inputted, determines whether the ID data is correct, referring to the original ID data stored; when the ID data is incorrect, determines whether the PIN code inputted through a PIN code input device is correct, referring to the PIN code stored; when the PIN code is incorrect, initializes the number of chance flags associated with the original ID data stored; when the PIN code is correct, stores the ID data newly inputted, replacing the original ID data stored.

8 Claims, 22 Drawing Sheets

FIG. 5

| | ARRANGEMENT AREA 151 | ARRANGEMENT AREA 152 | ARRANGEMENT AREA 153 | ARRANGEMENT AREA 154 | ARRANGEMENT AREA 155 |
|---|---|---|---|---|---|
| CODE NO. | SYMBOL | SYMBOL | SYMBOL | SYMBOL | SYMBOL |
| 00 | Angelfish | Tuna | Tuna | Coelacanth | Clownfish |
| 01 | Clownfish | Coelacanth | Tuna | Angelfish | Tuna |
| 02 | Angelfish | Tuna | Angelfish | Clownfish | Angelfish |
| 03 | Clownfish | Coelacanth | Tuna | BONUS | Coelacanth |
| 04 | Angelfish | Tuna | Angelfish | Coelacanth | Clownfish |
| 05 | Clownfish | Angelfish | Clownfish | Clownfish | 7 |
| 06 | Angelfish | Clownfish | Angelfish | Tuna | Angelfish |
| 07 | Clownfish | Tuna | Clownfish | 7 | Tuna |
| 08 | 7 | Coelacanth | Angelfish | Clownfish | Clownfish |
| 09 | Tuna | Tuna | Clownfish | Angelfish | Coelacanth |
| 10 | Angelfish | Coelacanth | Angelfish | Coelacanth | Tuna |
| 11 | Coelacanth | BONUS | Clownfish | Angelfish | Clownfish |
| 12 | Angelfish | Clownfish | Coelacanth | Clownfish | Coelacanth |
| 13 | BONUS | 7 | BONUS | Tuna | Angelfish |
| 14 | 7 | Coelacanth | 7 | Tuna | Tuna |
| 15 | Angelfish | Tuna | Coelacanth | BONUS | Clownfish |
| 16 | Tuna | Coelacanth | Tuna | Tuna | Tuna |
| 17 | Clownfish | BONUS | Clownfish | Coelacanth | Angelfish |
| 18 | Angelfish | Clownfish | Angelfish | Clownfish | Coelacanth |
| 19 | Clownfish | Tuna | Clownfish | Angelfish | Angelfish |
| 20 | 7 | Coelacanth | Angelfish | Tuna | Clownfish |
| 21 | Tuna | Tuna | Clownfish | Clownfish | BONUS |

FIG. 9

JP CHANCE DATA TABLE

| TERMINAL NUMBER | ID NUMBER | TIME | | | |
|---|---|---|---|---|---|
| | | FIRST TIME | SECOND TIME | THIRD TIME | FOURTH TIME |
| A | 0403AK1980 | 11:00(1) | 13:00(2) | — | — |
| B | 1231MK1975 | 12:00(1) | 15:00(1) | 15:30(2) | — |
| C | 0115TY1945 | 11:30(1) | — | — | — |
| D | 0625MY1983 | 12:30(1) | 16:00(2) | — | — |

GAMING MACHINE AND PLAYING METHOD THEREOF, WHICH QUALIFIES PLAYER TO JOIN SPECIAL GAME THROUGH CHANCE GAME RUN AT THE SAME TIME BASE GAME IS RUN

CROSS REFERENCE TO RELATED APPLICATION

The present application claims priority from provisional application No. 61/038,622, which was filed on Mar. 21, 2008, the entire disclosure of which is herein incorporated by reference.

BACKGROUND OF THE INVENTION

1. Field of the Invention

The present invention relates to a gaming machine and a playing method thereof.

2. Description of Related Art

Among existing gaming machines, there is a gaming machine including: two or more gaming terminals; terminal controllers respectively provided to the gaming terminal, each of which controllers causes associated one of the gaming terminals to run a game; a center controller for controlling all the terminal controllers. This type of gaming machine is disclosed in specifications of U.S. Pat. No. 5,820,459, No. 4,283,709, or No. 6,003,013. A terminal controller of a gaming terminal runs a game and awards a payout based on the result of the game independently of another terminal controller of another gaming terminal. The center controller provides various jackpots such as progressive jackpots, mystery jackpots, or the like.

An object of the invention is to provide a gaming machine having an entertainment characteristic which is not brought about by the above mentioned prior art, and a playing method thereof.

It is another object of the present invention to provide a gaming machine and a playing method thereof, each realizing a new gaming characteristic by qualifying a player to join a special game through a chance game run at the same time a base game is run.

Still another object of the present invention is to provide a gaming machine that restrains another player from using a profit obtained by a player who has quit a game in the middle of the game.

SUMMARY OF THE INVENTION

A gaming terminal of a gaming machine of the present invention is a gaming terminal, including: a base game awarding a payout according to a predetermined combination; a chance game offering a chance of obtaining a chance flag which qualifies a player to join a special game offering a chance of winning a higher payout than the base game; an ID data input device into which ID data specifying a player is inputted; a PIN code associated with the ID data and the number of chance flags; a terminal storage unit that stores therein the number of chance flags in association with the ID data inputted into the ID data input device, and the PIN code; a PIN code input device through which the PIN code is inputted; a terminal display which displays images of the base game, the chance game, and the special game; and a terminal controller which performs the steps of: (a1) when the ID data is inputted into the ID data input device, storing the ID data in the terminal storage unit; (a2) running the base game and the chance game at the same time; (a3) determining and awarding a payout according to a result of the base game; (a4) determining and awarding the number of chance flags according to a result of the chance game; (a5) accumulatively storing, in the terminal storage unit, the number of chance flags awarded, in association with the ID data and the PIN code; (a6) awarding a payout determined according to a result of the special game which is run when the number of the chance flags stored in the terminal storage unit equals or surpasses a predetermined number; (a7) when the ID data is newly inputted into the ID data input device, determining whether the newly inputted ID data is correct, referring to the original ID data stored in the terminal storage unit; (a8) when it is determined that the newly inputted ID data is not correct, determining whether the PIN code inputted through the PIN code input device is correct, referring to the PIN code stored in the terminal storage unit; and (a9) when it is determined that the PIN code inputted through the PIN code input device is not correct, initializing the number of chance flags associated with the original ID data stored in the terminal storage unit, and when it is determined that the PIN code inputted through the PIN code input device is correct, storing the newly inputted ID data, replacing the original ID data stored in the terminal storage unit.

(First Aspect)

According to the structure, the gaming terminal runs the base game, and at the same time runs the chance game offering a chance of obtaining a chance flag which qualifies a player to join the special game offering a chance of winning a higher payout than the base game. Then, the player is awarded a payout according to a result of the base game, and is given zero or more chance flags according to a result of the chance game. Further, the number of chance flags awarded is accumulatively stored in the terminal storage unit of the gaming terminal. When this number equals or surpasses a predetermined number, the special game is run. According to a result of the special game is awarded a payout. This structure allows the player to play the chance game while he/she plays the base game, and allows the player to obtain zero or more chance flags according to a result of the chance game. Accordingly, the player is able to know the result of the chance game while enjoying the base game. This realizes a higher level of gaming characteristic than a gaming machine which independently runs a chance game inside the game terminal where a player is not able to see. Moreover, when the ID data specifying a player is newly inputted through the ID data input device, it is determined whether the newly inputted ID data is correct or not. When it is determined that the newly inputted ID data is not correct, it is determined whether the PIN code inputted through the PIN code input device is correct or not. When it is determined that the PIN code inputted through the PIN code input device is not correct, the number of chance flags associated with the original ID data stored in the terminal storage unit is initialized. When it is determined that the PIN code inputted through the PIN code input device is correct, the newly inputted ID data is stored in the terminal storage unit, replacing the original ID data. Hence, when a second player other than the first player who has obtained one or more chance flags intends to play a game, it is possible to restrain the second player from using the one or more chance flags obtained by the first player, and to enable only a player who correctly inputs the PIN code to continuously use the one or more chance flags obtained by the first player.

In the gaming terminal of the gaming machine according to the present invention, the ID data input device of the gaming terminal according to the first aspect may detect that a storage medium storing the ID data is inserted or removed, and may read out and receive the ID data when the storage medium is inserted.

(Second Aspect)

According to the above structure, the ID data is read out and received from the storage medium storing the ID data. Thus, it is possible to resolve an annoying task of inputting the ID data through the ID data input device.

The gaming terminal of the gaming machine according to the first aspect may include a PIN code generation unit that generates the PIN code. The ID data input device may detect that a storage medium storing the ID data is inserted or removed, and may read out and receive the ID data when the storage medium is inserted. The terminal controller may generate the PIN code with the PIN code generation unit and store it in the terminal storage unit when the storage medium is removed.

(Third Aspect)

According to the above structure, the ID data is read out and received from the storage medium storing the ID data. Thus, it is possible to resolve an annoying task of inputting the ID data through the ID data input device. In addition, the PIN code is generated by the PIN code generation unit when the storage medium is removed and then stored in association with the ID data and the number of chance flags. Thus, the PIN code can be changed every time the ID card is removed.

A gaming device of the present invention is a gaming device including: a plurality of the gaming terminals of the gaming machine of the first aspect; a special game offering a chance of winning a higher payout than a base game offering a chance of winning a payout according to a predetermined combination; a center storage unit storing the number of chance flags stored in a terminal storage unit of each of the gaming terminals and ID data that specifies a player, each of the chance flags qualifying a player to join the special game and the ID data being inputted from an ID data input device of each of the gaming terminals; a shared display which displays an image of the special game; a center controller which performs the steps of: (b1) obtaining the chance flags and the ID data from each of the gaming terminals; (b2) accumulatively storing, in the center storage unit of each of the gaming terminals, the obtained number of chance flags in association with the ID data; (b3) running the special game at a predetermined timing, when the number of chance flags stored in the center storage unit equals or surpasses a predetermined number; and (b4) determining a payout according to a result of the special game. (b5) when it is determined that ID data newly inputted into the ID data input device of each of the gaming terminals is not correct, and that a PIN code is not correct, initializing the number of chance flags associated with the original ID data stored in the center storage unit, the PIN code being inputted through a PIN code input device of each of the gaming terminals and associated with the ID data and the number of chance flags; (b6) when it is determined that the newly inputted ID data is not correct, and that the PIN code inputted through the PIN code input device is correct, storing the newly inputted ID data, replacing the original ID data stored in the center storage unit; and (b7) when the number of chance flags associated with the newly inputted ID data is stored in the center storage unit, adding the number of chance flags associated with the newly inputted ID data to the initialized number of chance flags of the gaming terminal associated with the original ID data.

(Fourth Aspect)

According to the structure, each of the gaming terminals runs the base game, and at the same time runs the chance game offering a chance of obtaining a chance flag which qualifies a player to join the special game offering a chance of winning a higher payout than the base game. Then, the player is awarded a payout according to a result of the base game, and is given zero or more chance flags according to a result of the chance game. Further, the number of chance flags awarded is accumulatively stored in the center storage unit. When this number equals or surpasses a predetermined number, the center controller runs the special game. The center controller then determines a payout according to a result of the special game. The payout determined by the center controller is awarded to the player by the terminal controller of the gaming terminal. This structure allows the player to play the chance game while he/she plays the base game, and allows the player to obtain zero or more chance flags according to a result of the chance game. Accordingly, the player is able to know the result of the chance game while enjoying the base game. This realizes a higher level of gaming characteristic than a gaming machine which independently runs a chance game inside the game terminal where a player is not able to see. Further, the shared display allows players to play the special game at the same time. With this, the players may be able to share the feeling while enjoying the special game. Moreover, when the ID data specifying a player is newly inputted from the ID data input device, it is determined whether the newly inputted ID data is correct or not. When it is determined that the newly inputted ID data is not correct, and that the PIN code inputted through the PIN code input device is not correct, the number of chance flags associated with the original ID data stored in the terminal storage unit is initialized. Hence, when a second player other than the first player who has obtained one or more chance flags intends to play a game, it is possible to restrain the second player from using the one or more chance flags obtained by the first player. On the other hand, when it is determined that the PIN code inputted through the PIN code input device is correct, the newly inputted ID data is stored, replacing the original ID data stored in the terminal storage unit. Hence, it is possible to enable only a player who correctly inputs the PIN code to continuously use the one or more chance flags obtained by the previous player. In addition, when the number of chance flags associated with the newly inputted ID data from the ID data input device is stored in the center storage unit, the number of chance flags can be added to the initialized number of chance flags of the gaming terminal. Thus, it is possible to enable even a player who has changed gaming terminals to continuously use the one or more chance flags s/he has obtained. Hence, a player is able to select a gaming terminal more freely.

In the gaming device of the gaming machine according to the present invention, the ID data input device of the gaming terminal according to the fourth aspect may detect that a storage medium storing the ID data is inserted or removed, and may read out and receive the ID data when the storage medium is inserted.

(Fifth Aspect)

According to the above structure, the ID data is read out from the storage medium storing the ID data. Thus, it is possible to resolve an annoying task of inputting the ID data into the ID data input device.

In the gaming device of the gaming machine of the present invention, the gaming terminal according to the fourth aspect may include a PIN code generation unit that generates the PIN code. The ID data input device may detect that a storage medium storing the ID data is inserted or removed, and may read out and receive the ID data when the storage medium is inserted. The terminal controller of the gaming terminal may generate the PIN code with the PIN code generation unit and store the generated PIN code in the terminal storage unit when the storage medium is removed.

(Sixth Aspect)

According to the above structure, the ID data is read out from the storage medium storing the ID data. Thus, it is possible to resolve an annoying task of inputting the ID data into the ID data input device. In addition, a PIN code is generated by the PIN code generation unit when the storage medium is removed, and then stored in association with the ID data and the number of chance flags. Thus, the PIN code can be changed every time the ID card is removed.

In the gaming device of the gaming machine according to the present invention, the gaming terminal of the fourth aspect may include a count unit that measures time. The ID data input device of the gaming terminal may detect that a storage medium storing the ID data is inserted or removed, and may read out and receive the ID data when the storage medium is inserted. When the storage medium is removed from the ID data input device, the terminal controller of the gaming terminal may cause the count unit to start measuring time. When the storage medium is inserted into any one of the gaming terminals in a predetermined period of time, the terminal controller may cause the count unit to stop the time recording. When the storage medium is not inserted into any one of the gaming terminals in a predetermined period of time, the terminal controller may initialize the number of chance flags stored in the terminal storage unit of the gaming terminal from which the storage medium has been removed.

(Seventh Aspect)

According to the above structure, the ID data is read out from the storage medium storing the ID data. Thus, it is possible to resolve an annoying task of inputting the ID data through the ID data input device. Further, when the storage medium is not inserted into the ID data input device of any one of the gaming terminals in a predetermined period of time after the storage medium is removed, the number of chance flags obtained is initialized. Hence, even when a player quits a game without consuming the one or more chance flags s/he has obtained, it is possible to restrain another player from using the one or more chance flags.

In the gaming device of the gaming machine according to the present invention, the gaming terminal of the fourth aspect may include a count unit that records time, and a PIN code generation unit that generates a PIN code. The ID data input device may detect that a storage medium storing the ID data is inserted or removed, and may read out and receive the ID data when the storage medium is inserted. When the storage medium is removed, the terminal controller of the gaming terminal may cause the PIN code generation unit to generate and store the PIN code in the terminal storage unit, and further cause the count unit to start measuring time. When the storage medium is inserted into any one of the gaming terminals in a predetermined period of time, the terminal controller may cause the count unit to stop measuring time. When the storage medium is not inserted into any one of the gaming terminals in a predetermined period of time, the terminal controller may initialize the number of chance flags stored in the terminal storage unit of the gaming terminal from which the storage medium has been removed.

According to the above structure, the ID data is read out from the storage medium storing the ID data. Thus, it is possible to resolve an annoying task of inputting the ID data into the ID data input device. In addition, the PIN code is generated by the PIN code generation unit when the storage medium is removed, and then stored in association with the ID data and the number of chance flags. Thus, the PIN code can be changed every time the ID card is removed. Further, when the storage medium is not inserted in a predetermined period of time after the storage medium is removed, the number of chance flags obtained is initialized. Hence, even when a player quits a game without consuming the one or more chance flags obtained, the remaining number of chance flags can be initialized after a predetermined period of time. Accordingly, it is possible to restrain a second player other than the first player who has obtained one or more chance flags, from using the one or more chance flags.

BRIEF DESCRIPTION OF THE DRAWINGS

FIG. 5 is an explanatory diagram illustrating a symbol column of symbols rearranged on the terminal display.

FIG. 9 is an explanatory diagram illustrating a JP chance data table stored in a center controller.

DESCRIPTION OF THE PREFERRED EMBODIMENTS

The following describes an embodiment of a gaming machine and a playing method thereof according to the present invention.

Figure 3:
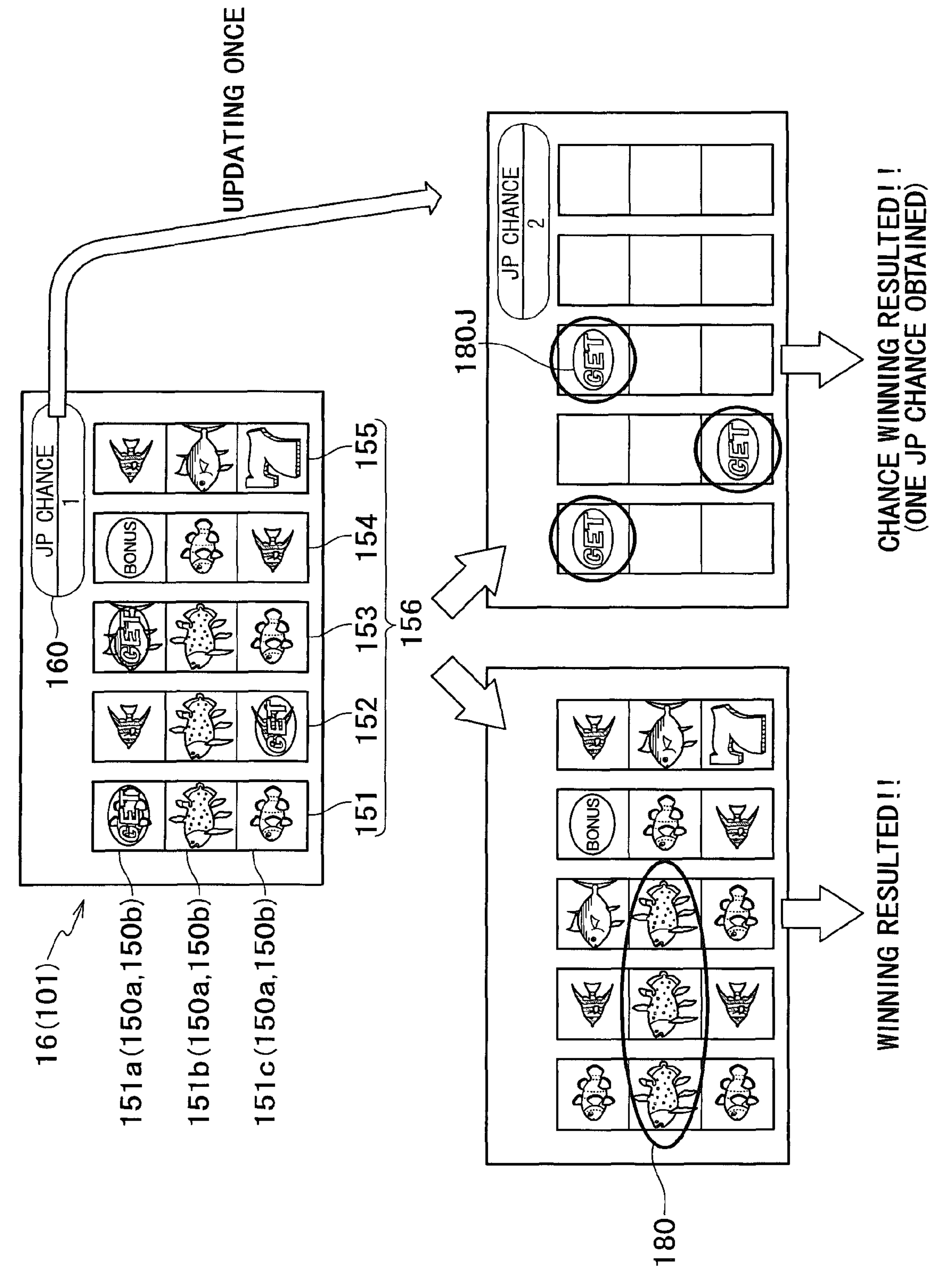
FIG. 3 is an explanatory diagram illustrating a display state of a terminal display during a base game and chance game.

As illustrated in FIG. 3, a gaming terminal 10 of the present invention executes a playing method including the steps of: running a base game and a chance game at the same time; determining and awarding a payout according to a result of the base game; determining and awarding the number of JP chances according to a result of the chance game; and awarding a payout determined according to a result of the JP game which is run when the number of the JP chances equals or surpasses a predetermined number.

In the present embodiment, the gaming terminal 10 runs a slot game. A "base game" in this specification is a game in which base symbols 180 are rearranged in base symbol arrangement areas 150*a*, and a payout is awarded when a winning is formed according to a relation of the base symbols 180 rearranged. The base game is run under base state. FIG. 3 will be described later.

As shown in FIG. 3, a "chance game" is a game in which JP symbols 180J are rearranged in JP symbol arrangement areas 150*b*, at the same time the base symbols 180 are rearranged in the base game, and a JP chance is awarded when a chance winning is formed according to a relation of the JP symbols 180J rearranged.

Figure 4:
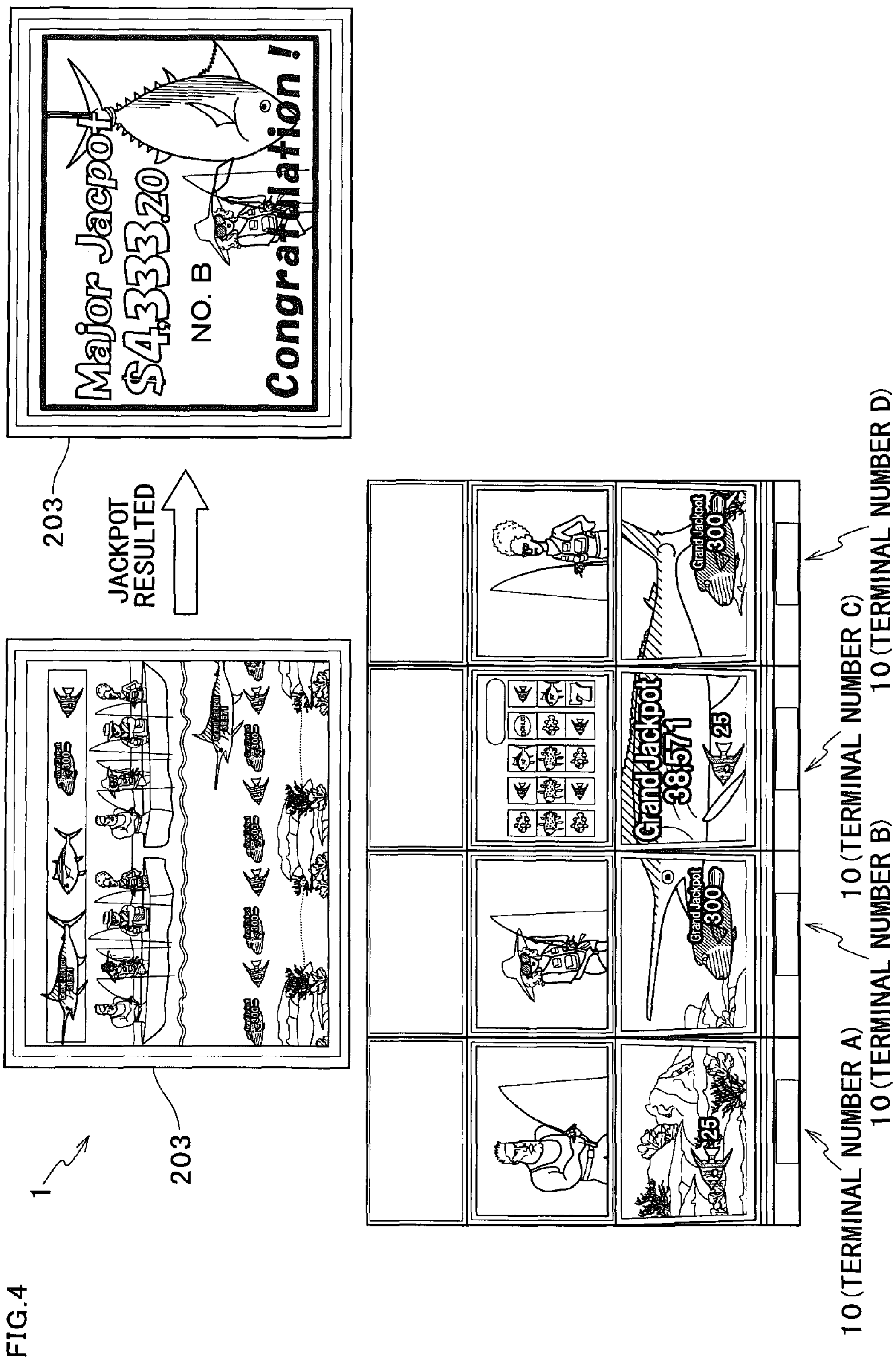
FIG. 4 is an explanatory diagram illustrating display states of a shared display and a terminal display during a special game.

As shown in FIG. 4, a "JP game" is a special game that is run by a later-detailed center controller 200 at the same time in two or more gaming terminals 10 at a predetermined time interval. When this JP game results in a jackpot, a higher payout than a payout awarded from the base game is awarded. The JP game is run at a predetermined timing such as every 30 minutes or the like, and is run only for gaming terminals 10 having obtained at least a predetermined number (e.g. one) of JP chances. In this embodiment, the JP game is a virtual "Fishing Tournament" played by players who have obtained the predetermined number of JP chances. The players playing the JP game are able to see their selected characters fishing on a shared display 203.

The "arrangement" in this specification means a state where the base symbols 180 and JP symbols 180J can be visually observed by a player, as shown in FIG. 3. That is, in FIG. 3, the wording means the base symbols 180 displayed in the base symbol arrangement areas 150*a*, and the JP symbol 180J displayed in the JP symbol arrangement areas 150*b*. Arranging the base symbols 180 or the JP symbols 180J again after dismissing them is referred to as "rearranging".

Further, the "base symbols 180" are symbols including scatter symbols, which are used in a base game in each of the gaming terminals 10.

Each of the "scatter symbols" is a symbol whose arrangement could result in a winning irrespective of a pay line L. Appearance of a predetermined number (for example, three) of scatter symbols in a matrix 156 gives an advantage to a player. For example, the advantages includes: a state where coins corresponding to the scatter symbols are paid out, a state where the number of coins to be paid out is added to a credit, a state where a bonus game is started. The pay line L is detailed later.

The "winning" is a result of the base game, by which a payout is awarded. For example, the winning is resulted when a predetermined number (e.g. three) of scatter symbols 156 are arranged in the matrix 156.

Further, the "JP symbols 180J" are symbols used in the chance game in the gaming terminal 10, whose arrangement could result in a winning irrespective of a pay line L. For example, a predetermined number (e.g. three) of JP symbols 180 arranged in the matrix 156 give an advantage to the player. The advantage is a JP chance awarded to the player.

The "chance winning" means that a chance game has resulted in a winning, consequently awarding a JP chance. For example, the chance winning is resulted when a predetermined number (e.g. three) of JP symbols 180J are arranged in the matrix 156. Note that the present embodiment deals with a case where one JP chance is awarded to a player when three JP symbols 180 are arranged in the matrix 156.

The "JP chance" qualifies a player to join the JP game. For each JP chance, a process of determining whether or not a jackpot is awarded is performed once.

The "jackpot" means that the JP game has resulted in a winning, consequently awarding a payout.

Figure 1:
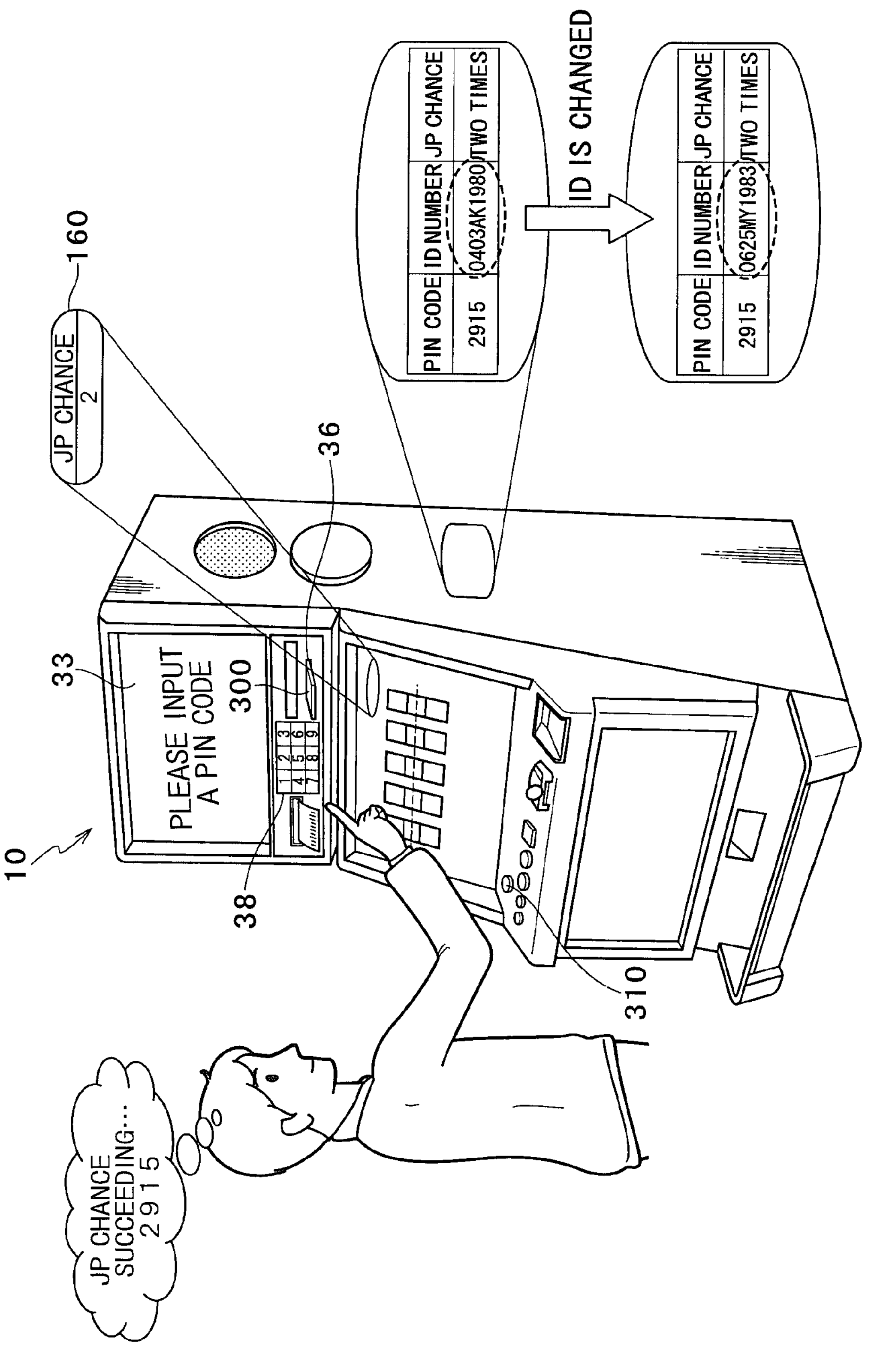
FIG. 1 illustrates a gaming machine and a playing method thereof, according to the present invention.

As shown in FIG. 1, the gaming terminal 10 of the gaming machine 1 according to the present invention has a card reader 36 with which ID data specifying a player is inputted and a keypad 38 through which a PIN code is inputted.

In this embodiment, the "ID data" is identification data that is allotted to each player so as to identify the player. The ID data is stored, in a later-described RAM 43 of the gaming terminal 10, in association with the number of JP chances obtained by a player. Likewise, the ID data is also stored, in a later-described RAM 243 of the center controller 200, in association with the number of JP chances. In the meantime, the RAM 243 stores therein a later-described JP chance data table shown in FIG. 9. The JP chance data table stores therein ID data of players and the number of JP chances associated with the ID data, for each of the gaming terminals 10.

The "PIN" code is an abbreviation for "Personal Identification Number" code that is a unique identification number for specifying a device or person. In this embodiment, the PIN code is used for a player to succeed to the number of JP chances obtained by another player. The PIN code is a four-digit security code.

Further, in the gaming terminal 10 of the gaming machine 1 according to the present invention, the card reader 36 detects that an ID card 300 storing the ID data is inserted or removed. When the ID card 300 is inserted, the ID data is read out and received. The "ID card 300" is possessed by each player, and is a storage medium that stores the ID data allotted to each player, data about game history played by a player, or the like. In this embodiment, a game can be run only when the ID card 300 is inserted into the card reader 36 and the ID data is received.

The gaming terminal 10 of the gaming machine 1 according to the present invention determines, when ID data is newly inputted into the card reader 36, whether the newly inputted ID data is correct or not, referring to the original ID data stored in the RAM 43. When it is determined that the newly inputted ID data is not correct, the gaming terminal determines whether the PIN code inputted through the keypad 38 is correct, referring to the PIN code stored in the RAM 43. When it is determined that the PIN code inputted from the keypad 38 is not correct, the gaming terminal initializes (for example, to "0") the number of JP chances associated with the original ID data stored in the RAM 43. When it is determined that the PIN code inputted through the keypad 38 is correct, the gaming terminal stores in the RAM 43 the newly inputted ID data, replacing the original ID data stored.

In this embodiment, the newly inputted ID data is compared with the original ID data to determine whether the ID data newly inputted to the card reader 36 is correct. In short, when the two ID data are compared and it is determined that they are the ID data of same numbers, the newly inputted ID data is determined to be correct.

It is determined whether the PIN code inputted through the keypad 38 by a player succeeding to JP chances is correct, by comparing the PIN code with the PIN code processed by the player who has stopped playing the game despite the JP chances s/he has obtained. When the PIN codes are the same as a result of the comparison, it is determined that the PIN code inputted through the keypad 38 is correct.

FIG. 1, for instance, illustrates a situation where a player (hereinafter, referred to as a successor player) succeeds to the JP chances from another player (hereinafter, referred to as a stop player) who has quit a game despite the two JP chances s/he has obtained. The successor player inserts the ID card 300 in the card reader 36 so as to start a game. At this time, an upper image display panel 33 of the gaming terminal 10 displays thereon a message to urge the player to input a PIN code. Thereby, the successor player inputs a PIN code "2915" through the keypad 38. The PIN code "2915" has been already acquired from a player who has quit a game. It is determined whether the PIN code inputted by the successor player is correct or not. In short, it is determined whether the inputted PIN code is identical to the PIN code obtained by the player who has quit a game. When it is determined that the PIN code is correct, the gaming terminal stores the ID data "0625 MY1983" newly inputted by the successor player, replacing the ID data "0403 AK1980" of the stop player which is stored in the RAM 43 (not shown).

On the other hand, if it is determined that the PIN code inputted by the successor player is not correct, the number ("2") of JP chances obtained by the stop player is initialized ("0").

In the gaming terminal 10 of the gaming machine 1 according to the present invention, the PIN code is generated by a later-described terminal controller 100 and stored in the RAM 43, and then displayed on the upper image display panel 33 for a predetermined period of time (for example, 15 seconds), when the ID card 300 is removed from the card reader 36.

For example, in FIG. 1, when the stop player quits a game, the ID card 300 is removed from the card reader 36. At this time, the PIN code "2915" is generated.

Further, the gaming terminal 10 of the gaming machine 1 according to the present invention includes a later-described count unit 123 that measures time. When the ID card 300 is removed from the card reader 36, the terminal controller 100 of the gaming terminal 10 causes the count unit 123 to start measuring time. When the ID card 300 is inserted into any one of the gaming terminals 10 in a predetermined period of time, the terminal controller causes the count unit to stop measuring time. When the ID card 300 is not inserted into one of the gaming terminals in a predetermined period of time, the terminal controller initializes (for example, to "0") the number of JP chances stored in the RAM 43 of the gaming terminal 10 from which the ID card 300 has been removed.

For example, in FIG. 1, time recording starts when the stop player removes the ID card 300 from the card reader 36. When the ID card 300 of the stop player is not inserted into any one of the gaming terminals in a predetermined period of time, the number of JP chances ("2") obtained by the stop player is initialized (to "0"). On the other hand, when the ID card 300 is inserted into any one of the gaming terminals in a predetermined period of time, the time recording is stopped.

Figure 2:
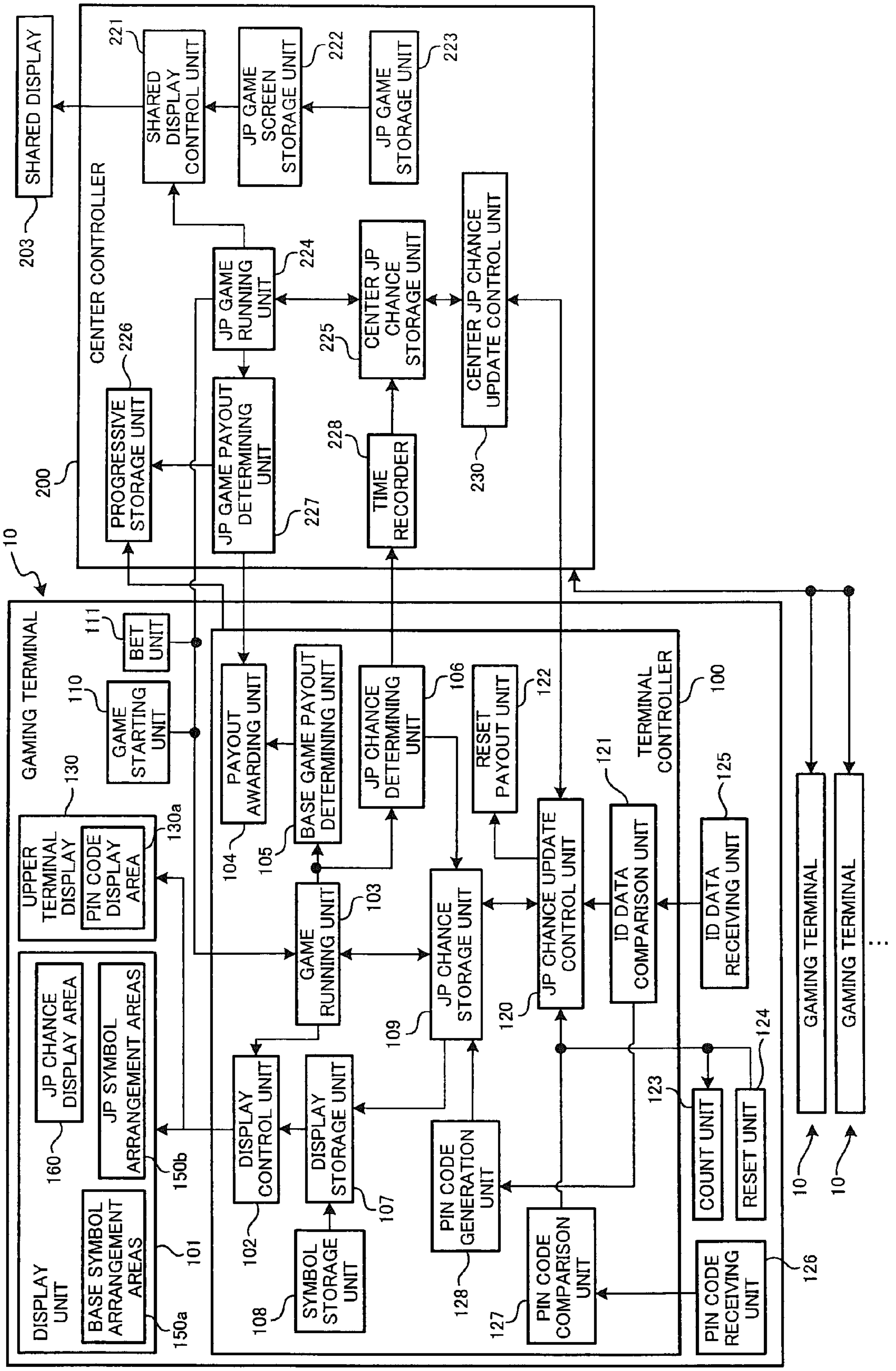
FIG. 2 is a block diagram of the gaming machine.

As illustrated in FIG. 2, the gaming machine 1 which executes the above mentioned control method has a shared display 102, a center controller 100, and gaming terminals 10. Each of the gaming terminals 10 includes a terminal display 101, an upper terminal display 130, a terminal controller 100, an ID data receiving unit 125, a count unit 123, a reset unit 124 and a PIN code receiving unit 126.

(Terminal Display 101)

As illustrated in FIG. 3, the terminal display 101 serving as a display unit has base symbol arrangement areas **150*a*, JP symbol arrangement areas 150*b*, and a JP chance display area 160**.

Each of the base symbol arrangement areas **150*a* is an area of the terminal display 101 where a base symbol 180 is arranged. Each of the JP symbol arrangement areas 150*b* is an area of the terminal display 101 where a JP symbol 180J is arranged. The base symbol arrangement areas 150*a* and the JP symbol arrangement areas 150*b* are arranged on the terminal display 101 so that a base symbol arrangement area 150*a* overlaps a JP symbol arrangement area 150*b*. In other words, the base symbols 180 and the JP symbols 180**J are varied or stopped by means of two-layered reels.

The JP chance display area 160 displays therein a total number of JP chances obtained in a chance game. Note that the number of JP chances obtained in each chance game is added to the number of JP chances displayed in the JP chance display area 160. This number of the JP chances displayed in the JP chance display area 160 is brought back to an initial value such as "zero", when all the JP chances are consumed by running the JP game.

As illustrated in FIG. 3, the base symbol arrangement areas **150*a* and the JP symbol arrangement areas 150*b* form the display windows 151 to 155. For example, arrangement areas 151*a*, 151*b*, and 151*c* form the display window 151. Further, the display windows 151 to 155 form the matrix 156. The matrix 156, in other words, is a matrix including the plurality of base symbol arrangement areas 150*a* and the JP symbol arrangement areas 150*b***.

The terminal display 101 may have a mechanical structure adopting a reel device which rotates a reel to arrange the base symbols 180 and the JP symbols 180J. Alternatively, the terminal display 101 may have an electric structure in which a video reel is displayed as an image, and the base symbols 180 and JP symbols 180J on the video reel are arranged in the form of an image. Further, the terminal display 101 may adopt a combination of the mechanical structure (reel) and the electrical structure (video reel). Examples of the electrical structure include a liquid crystal display device, a CRT (cathode-ray tube), a plasma display device, or the like. Further, the number of the base symbol arrangement areas **150*a* and that of the JP symbol arrangement areas 150*b* are not limited. A specific structure of the terminal display 101** will be detailed later.

(Shared Display 203)

The shared display 203 displays thereon a virtual "Fishing Tournament" in the JP game, as illustrated in FIG. 4. A specific structure of the shared display 203 will be detailed later.

(Upper Terminal Display 130)

As shown in FIG. 2, the upper terminal display 130 serving as an upper display unit has a PIN code display area **130*a*. The PIN code display area 130*a* is an area that displays a PIN code generated by a later-detailed PIN code generation unit 128. When it is determined that the ID data, which is newly inputted by the ID card 300 inserted into the card reader 36**, is not correct, the PIN code display area displays a message to urge a player to input a PIN code.

(Terminal Controller 100)

The terminal controller 100 is structured to execute a first process of, when ID data is inputted into the ID data receiving unit 125, storing the ID data in a JP chance storage unit 109; a second process of running a base game and a chance game at the same time; a third process of determining and awarding a payout according to a result of the base game; a fourth process of determining and awarding the number of JP chances according to a result of the chance game; a fifth process of accumulatively storing the number of JP chances awarded, in the JP chance storage unit 109, in association with ID data and a PIN code; a sixth process of awarding a payout determined according to a result of a JP game that is run when the number of JP chances stored in the JP chance storage unit 109 equals or surpasses a predetermined number; a seventh process of, when ID data is newly inputted to the ID data receiving unit 125, determining whether the newly inputted ID data is correct, referring to the original ID data stored in the JP chance storage unit 109; a eighth process of, when it is determined that the newly inputted ID data is not correct, determining whether a PIN code inputted from a PIN code receiving unit 126 is correct, referring to the PIN code stored in the JP chance storage unit 109; and a ninth process of, when it is determined that the PIN code inputted from the PIN code receiving unit 126 is not correct, initializing the number of JP chances associated with the original ID data stored in the JP chance storage unit 109, and when it is determined that the PIN code inputted from the PIN code receiving unit 126 is correct, storing the newly inputted ID data, replacing the original ID data stored in the JP chance storage unit 109.

In addition, the terminal controller 100 is structured to execute a tenth process of, when the ID card 300 is removed from the card reader 36, generating a PIN code by a PIN code generation unit 128 to store the generated PIN code in the JP chance storage unit 109.

Further, the terminal controller 100 is structured to execute a eleventh process of, when the ID card 300 is removed from the card reader 36, causing the count unit 123 to start measuring time, and when the ID card 300 is inserted into any one of the gaming terminals 10 in a predetermined period of time, causing the count unit to stop measuring time, and when the ID card 300 is not inserted in a predetermined period of time, initializing the number of JP chances stored in the JP chance storage unit 109 of the gaming terminal 10 from which the ID card 300 has been removed. In other words, the terminal controller 100 has first to eleventh processing units.

The terminal controller 100 is connected to a center controller 200 and is in communication with the center controller 200.

As illustrated in FIG. 2, the terminal controller 100 is connected to a game starting unit 110. The game starting unit 110 has a function of outputting a game start signal, in response to an operation by the player. The game start signal output is then input to a later-detailed game running unit 103.

In response to the game start signal serving as a trigger, the terminal controller 100 outputs a progressive signal to the progressive storage unit 226 of a later mentioned center controller. The progressive signal is a signal indicating a game value. The game value is the source of payout of the JP game, which is collected from each of the gaming terminals 10. (The game value is hereinafter referred to as a progressive value.)

The terminal controller 100 is connected to a BET unit 111. The BET unit 111 has functions of receiving a bet entered through an operation by the player, and outputting a BET signal. The BET signal output is input to the later-detailed game running unit 103.

The terminal controller 100 is connected to the ID data receiving unit 125. The ID data receiving unit 125 is a functional unit of the card reader 36. When the ID card 300 is inserted into the card reader 36, the ID data receiving unit 125 reads out and receives ID data from the ID card 300. In addition, the ID data receiving unit 125 has a function of detecting that the ID card 300 is removed from the card reader 36 and the ID card is read out. In the meantime, the ID data receiving unit 125 outputs a signal to an ID data comparison unit 121, when the ID card 300 is inserted or removed to or from the card reader 36.

In addition, the terminal controller 100 is connected to the count unit 123. The count unit 123 starts or stops measuring time, under control of a later-described JP chance update control unit 120.

Further, the terminal controller 100 is connected to a reset unit 124. The reset unit 124 outputs a reset button pressed signal to the JP chance update control unit 120, when a player presses the reset button 310.

Further, the terminal controller 100 is connected to a PIN code receiving unit 126. The PIN code receiving unit 126 is a functional unit of the keypad 38. The PIN code receiving unit 126 has a function of receiving a PIN code inputted through the keypad 38. When a PIN code is inputted through the keypad 38, the PIN code receiving unit 126 outputs a signal to a later-described PIN code comparison unit 127.

The terminal controller 100 includes: the game running unit 103, a symbol storage unit 108, a JP chance storage unit 109, a display storage unit 107, and a display control unit 102.

The game running unit 103 runs a base game, triggered by the game start signal from the game starting unit 110. The base game is a game in which base symbols 180 are rearranged in the base symbol arrangement areas 150 of the terminal display 101. At the same time of running the base game, the game running unit 103 also runs a chance game in which JP symbols 180J are rearranged in the JP symbol arrangement areas 150*b* of the terminal display 101. Further, the game running unit 103 causes the display control unit 102 to display a JP game, in response to a JP game start signal from the JP game running unit 224. Further, the game running unit 103 causes the display control unit 102 to stop displaying the JP game, in response to a JP game end signal from the game running unit 224. The game running unit 103 then resumes the base game and the chance game.

Further, when a PIN code is generated by the PIN code generation unit 128, the game running unit 103 causes the display control unit 102 to display the generated PIN code.

The symbol storage unit 108 stores the base symbols 180 and JP symbols 180J. The JP chance storage unit 109 is a functional unit of the later-described RAM 43. The JP chance storage unit 109 accumulatively stores therein the number of JP chances obtained, in association with ID data and a PIN code. The display storage unit 107 stores, as a symbol to be displayed, the base symbols 180 and JP symbols 180J in the symbol storage unit 108. The display storage unit 107 stores the number of JP chances and the PIN code in the JP chance storage unit 109, as the number to be displayed. Further, the display storage unit 107 stores a message to urge a player to input a PIN code as texts to be displayed.

The control unit 102 performs setting so that the base symbol arrangement areas 150*a* for arranging therein the base symbols 180 overlap the JP symbol arrangement areas 150*b* for arranging therein the JP symbols. Further, the display control unit 102 reads out base symbols 180 from the display storage unit 107 and displays the base symbols 180 in the base symbol arrangement areas 150*a*, under the control of the game running unit 103. The display control unit 102 also reads out JP symbols 180J from the display storage unit 107 and displays the JP symbols 180J in the JP symbol arrangement areas 150*b*, under the control of the game running unit 103. Further, the display control unit 102 reads out the number of JP chances stored in the display storage unit 107 and displays the number on the JP chance display area 160, under the control of the game running unit 103.

Moreover, when a PIN code is generated by the PIN code generation unit 128 based on a control signal from the game running unit 103, the display control unit 102 displays the generated PIN code on the PIN code display area 130*a* for a predetermined period of time. In addition, based on a control signal from the JP chance update control unit 120, the display control unit 102 displays a message to urge a player to input a PIN code in the PIN code display area 130*a*.

In addition, the terminal controller 100 includes an ID data comparison unit 121, a reset payout unit 122, a PIN code generation unit 128, a PIN code comparison unit 127 and a JP chance update control unit 120.

When the ID card 300 is removed from the card reader 36 and the ID data is read out, the ID data comparison unit 121 outputs an ID data discharge signal to the JP chance update control unit 120. Moreover, when the ID data is discharged, the ID data comparison unit 121 outputs a PIN code generation signal to the PIN code generation unit 128. Moreover, the ID data comparison unit 121 determines whether the newly inputted ID data from the ID data receiving unit 125 is correct, based on a signal from the ID data receiving unit 125. At this time, the ID data comparison unit obtains the original ID data stored in the JP chance storage unit 109 through the JP chance update control unit 120, thereby determining the newly inputted ID data. As a result, when it is determined that the newly inputted ID data is correct, the ID data comparison unit outputs an correct information signal to the JP chance update control unit 120. On the other hand, when the newly inputted ID data is not correct, the ID data comparison unit outputs an incorrect information signal to the JP chance update control unit 120.

The reset payout unit 122 cashes out the number of coins bet on a JP game to the player under control of the JP chance update control unit 120, when a player presses the reset button 310.

The PIN code generation unit 128 generates a PIN code upon receiving a PIN code generation signal from the ID data comparison unit 121. In addition, the PIN code generation unit 128 stores the PIN code generated, in the JP chance storage unit 109, in association with the number of JP chances awarded and the ID data.

The PIN code comparison unit 127 determines whether the PIN code inputted from the PIN code receiving unit 126 is correct or not, based on a signal from the PIN code receiving unit 126. When it is determined that the PIN code is correct, the PIN code comparison unit outputs a PIN code-correct signal to the JP chance update control unit 120. When it is determined that the PIN code is not correct, the PIN code comparison unit outputs a PIN code-incorrect signal to the JP chance update control unit 120.

The JP chance update control unit 120 causes the count unit 123 to start measuring time, in response to the ID data discharge signal from the ID data comparison unit 121. After a predetermined period of time since the count unit 123 has started recording time, the JP chance update control unit 120 initializes the number of JP chances that is stored in the JP chance storage unit 109, in association with the ID data and the PIN code. Further, the JP chance update control unit outputs a center-side reset signal to a center JP chance update control unit 230.

In addition, the JP chance update control unit 120 causes the count unit 123 to stop measuring time, in response to the correct information signal from the ID data comparison unit 121.

On the other hand, the JP chance update control unit 120 causes the display control unit 102 to display a message to urge a player to input a PIN code, in response to the incorrect information signal from the ID data comparison unit 121.

Further, in response to the PIN code-incorrect signal from the PIN code comparison unit 127 after causing the display control unit to display the message to urge a player to input a PIN code, the JP chance update control unit 120 stores the newly inputted ID data in the JP chance storage unit 109, replacing the original ID data, based on the signal from the ID data comparison unit 121, and initializes the number of JP chances that is stored in the JP chance storage unit 109, in association with the original ID data. At this time, the JP chance update control unit outputs a center-side reset signal and a new ID data information signal to a center JP chance update control unit 230 of the center controller 200. The new ID data information signal includes the information about ID number of the newly inputted ID data received in the ID data receiving unit 125, or the like.

In the meantime, in response to the PIN code-correct signal from the PIN code comparison unit 127 after the message to urge a player to input a PIN code is displayed the JP chance update control unit 120 stores the newly inputted ID data in the JP chance storage unit 109, replacing the original ID data, based on the signal from the ID data comparison unit 121, In this case, the number of JP chances stored in association with the original ID data remains uninitialized. At this time, the JP chance update control unit 120 outputs a succeeding ID information signal to a center JP chance update control unit 230 of the center controller 200.

In response to a reset button pressed signal from the reset unit 124, the JP chance update control unit 120 initializes the number of JP chances that is stored in the JP chance storage unit 109, in association with the original ID data. At this time, the JP chance update control unit 120 outputs a center-side reset signal to the center JP chance update control unit 230. Moreover, the JP chance update control unit 120 causes the reset payout unit 122 to pay out the coins bet on a JP game.

Furthermore, in response to a JP chance succeeding signal from the center JP chance update control unit 230, the JP chance update control unit 120 stores the number of succeeding JP chances in the JP chance storage unit 109 based on the JP chance continuing signal, and causes the count unit 123 to stop measuring time. The number of succeeding JP chances is the number of JP chances associated with the newly inputted ID data stored in a later-described center JP chance storage unit 225. In short, the number of succeeding JP chances is the number of JP chances that are obtained in a first gaming terminal 10 by a player who has newly inputted the ID data in a second gaming terminal 10. The JP chance succeeding signal includes the information about the number of succeeding JP chances.

Further, in response to a terminal-side reset signal from the center JP chance update control unit 230, the JP chance update control unit 120 initializes the number of JP chances that is stored in the JP chance storage unit 109, in association with the ID data. Meantime, the terminal-side reset signal is a signal that is transmitted to the first gaming terminal 10 from which a player has moved to another one.

The terminal controller 100 includes a base game payout determining unit 105, a JP chance determining unit 106, and a payout awarding unit 104.

The base game payout determining unit 105, under the control performed by the game running unit 103, determines whether to award a payout of a base game on the basis of the base symbols 180 rearranged in the base symbol arrangement areas 150*a*. In other words, the base game payout determining unit 105 determines whether a base game has resulted in a winning. If it is determined that the base game has resulted in a winning, the base game payout determining unit 105 determines the amount of the payout and outputs a signal to the payout awarding unit 104.

The JP chance determining unit 106, under the control of the game running unit 103, determines whether to award a JP chance on the basis of the JP symbols 180 rearranged in the JP symbol arrangement areas 150*b*. In other words, the JP chance determining unit 106 determines whether a chance winning is resulted. When it is determined that the chance game has resulted in a chance winning, the JP chance determining unit 106 determines the number of JP chances and outputs a JP chance signal to the JP chance storage unit 109 and a later-detailed time recorder 228 of the center controller 200.

The payout awarding unit 104 awards the payout of the base game determined by the base game payout determining unit 105. Further, the payout awarding unit 104 awards a payout of a JP game determined by a later-detailed JP game payout determining unit 227 of the center controller 200, in response to a signal from the JP game payout determining unit 227. Note that the JP game is run when the number of JP chances of a gaming terminal 10, which number is stored in a later-detailed center JP chance storage unit 225 of the center controller 200 for each gaming terminal 10, equals or surpasses a predetermined number. Further, an amount of the payout is determined by the JP game payout determining unit 227.

Meanwhile, each block of the terminal controller 100 may be realized with hardware or with software as needed.

(Operation of Terminal Controller 100)

The following describes an operation of the terminal controller 100 in the above structure. First, the ID data inputted into the card reader is read out and received by the ID data receiving unit 125 using the ID card 300. The received ID data is stored in the JP chance storage unit 109 by the JP chance update control unit 120 through the ID data comparison unit 121. Like this, the terminal controller 100 executes the first process of storing the ID data in the JP chance storage unit 109, when the ID data is inputted into the ID data receiving unit 125.

Then, the BET unit 111 receives a BET entered through an operation by a player. Further, a game start signal is output from the game starting unit 110 in response to the player's operation, and a base game and a chance game are run at the same time by the game running unit 103. When both of the games are run at the same time, the display control unit 102, under the control of the game running unit 103, displays base symbols 180 in the base symbol arrangement areas 150*a*. The display control unit 102 also displays JP symbols 180J in the JP symbol arrangement areas 150*b*. As described, the terminal controller 100 performs the second process of running a base game and a chance game at the same time, at a predetermined timing.

Further, the base game payout determining unit 105 determines whether the base game has resulted in a winning, based on a relation among the base symbols 180 rearranged in the base symbol arrangement areas 150*a*. If it is determined that the base game has resulted in a winning, the base game payout determining unit 105 determines an amount of a payout. The payout thus determined is awarded by the payout awarding unit 104. As described, the terminal controller 100 performs the third process of determining and awarding a payout according to a result of the base game.

Further, the JP chance determining unit 106 determines whether the chance game has resulted in a chance winning, on the basis of a relation among the JP symbols 180 rearranged in the JP symbol arrangement areas 150*b*. When it is determined that the chance game has resulted in the chance winning, the JP chance determining unit 106 determines and awards the number of JP chances. As described, the terminal controller 100 performs the fourth process of determining and awarding the number of JP chances according to a result of the chance game.

In addition, the number of JP chances awarded by the JP chance determining unit 106 is accumulatively stored in the JP chance storage unit 109, in association with the ID data. The PIN code generated by the PIN code generation unit 128 is stored in the JP chance storage unit 109, in association with the number of JP chances awarded and the ID data. Like this, the terminal controller 100 performs the fifth process of accumulatively storing, in the JP chance storage unit 109, the number of JP chances awarded, in association with the ID data and the PIN code.

Further, when a gaming terminal 10 has at least a predetermined number of JP chances, the later-detailed JP game payout determining unit 227 of the center controller 200 determines whether to award a payout of the JP game. In other words, the JP game payout determining unit 227 determines whether or not a jackpot is resulted. When it is determined that a jackpot is resulted, a payout amount of the JP game is determined. The payout of the JP game thus determined is awarded by the payout awarding unit 104. As described, the terminal controller 100 performs the sixth process of awarding a payout determined according to a result of the JP game that is run when the number of the JP chances equals or surpasses a predetermined number.

In addition, the ID data comparison unit 121 compares the ID data received by the ID data receiving unit 125 with the original ID data stored in the JP chance storage unit 109 so as to determine whether the ID data is correct or not. Like this, the terminal controller 100 performs the seventh process of, when ID data is newly inputted into the ID data receiving unit 125, determining whether the newly inputted ID data is correct or not, referring to the original ID data stored in the JP chance storage unit 109.

In addition, when a signal from the ID data comparison unit 121 is an incorrect information signal, the terminal controller causes the display control unit 102 to display a message to urge a player to input a PIN code. Afterwards, when a player inputs a PIN code, the PIN code comparison unit 127 determines whether the PIN code is correct or not. Like this, the terminal controller 100 executes the eighth process of, when it is determined that the newly inputted ID data is not correct, determining whether a PIN code inputted from a PIN code receiving unit 126 is correct or not, referring to the PIN code stored in the JP chance storage unit 109.

In addition, when the PIN code comparison unit 127 determines that the PIN code is not correct, the JP chance update control unit 120 stores the newly inputted ID data in the JP chance storage unit 109, replacing the original ID data. Further, the JP chance update control unit 120 initializes the number of JP chances stored in the JP chance storage unit 109, in association with the original ID data. Like this, the terminal controller 100 executes the ninth process of, when it is determined that the PIN code inputted from the PIN code receiving unit 126 is not correct, initializing the number of JP chances associated with the original ID data stored in the JP chance storage unit 109, and when it is determined that the PIN code inputted from the PIN code receiving unit 126 is correct, storing the newly inputted ID data, replacing the original ID data stored in the JP chance storage unit 109.

In addition, when the ID card 300 is removed from the card reader 36 and the ID data is discharged, the ID data comparison unit 121 outputs a PIN code generation signal to the PIN code generation unit 128. The PIN code generation unit 128 having received the PIN code generation signal generates a PIN code and stores the generated PIN code in the JP chance storage unit 109, in association with the number of JP chances awarded and the ID data. Like this, the terminal controller 100 executes the tenth process of, when the ID card 300 is removed from the card reader 36, generating a PIN code by a PIN code generation unit 128 to store the generated PIN code in the JP chance storage unit 109.

In addition, when the ID card 300 is removed from the card reader 36 and the ID data is discharged from the ID data receiving unit 125, an ID data discharge signal is outputted to the JP chance update control unit 120 from the ID data comparison unit 121. At this time, the JP chance update control unit 120 causes the count unit 123 to start measuring time. In response to the correct information signal or JP chance continuing signal from the ID data comparison unit 121, the JP chance update control unit 120 causes the count unit 123 to stop the measuring time. In the meantime, after a predetermined period of time since the count unit 123 has started measuring time, the JP chance update control unit initializes the number of JP chances that is stored in the JP chance storage unit 109, in association with the ID data. Like this, the terminal controller 100 performs the eleventh process of, when the ID card 300 is removed from the card reader 36, causing the count unit 123 to start measuring time, and when the ID card 300 is inserted into any one of the gaming terminals 10 in a predetermined period of time, causing the count unit to stop measuring time, and when the ID card 300 is not inserted in a predetermined period of time, initializing the number of JP chances stored in the JP chance storage unit 109 of the gaming terminal 10 from which the ID card 300 has been removed.

As clearly seen from the above operations, the gaming terminal 10 realizes a control method including the steps of: when ID data is inputted to the card reader 125, storing the ID data in a later-described RAM 43; running a base game and a chance game at the same time; determining and awarding a payout according to a result of the base game; determining and awarding the number of JP chances according to a result of the chance game; accumulatively storing, in the RAM 43, the number of JP chances awarded, in association with ID data and a PIN code; awarding a payout determined according to a result of a JP game that is run when the number of JP chances stored in the RAM 43 equals or surpasses a predetermined number; when ID data is newly inputted into the card reader 36, referring to the original ID data stored in the RAM 43 to determine whether the newly inputted ID data is correct or not; when it is determined that the newly inputted ID data is not correct, determining whether a PIN code inputted through a keypad 38 is correct or not, referring to the PIN code stored in the RAM 43; and when it is determined that the PIN code inputted through the keypad 38 is not correct, initializing the number of JP chances associated with the original ID data stored in the RAM 43, and when it is determined that the PIN code inputted from the keypad 38 is correct, storing the newly inputted ID data, replacing the original ID data stored in the RAM 43.

In the playing method, the gaming terminal 10 runs a base game, and at the same time, runs a chance game offering a chance of obtaining a JP chance which qualifies a player to join a JP game offering a chance of winning a higher payout than the base game. Then, the player is awarded a payout according the result of the base game, and is given zero or more chance flags according to the result of the chance game. The player is further awarded a payout according to a result of the JP game which is run when the number of JP chances awarded equals or surpasses a predetermined number. This structure allows a player to play the chance game while he/she plays the base game, and allows the player to obtain zero or more JP chances which are given according to a result of the chance game. Accordingly, the player is able to know the result of the chance game while enjoying the base game. This realizes a higher level of gaming characteristic than a gaming machine which independently runs a chance game inside the gaming terminal 10 where a player is not able to see. In addition, when the ID data specifying a player is newly inputted from the card reader 36, it is determined whether the newly inputted ID data is correct or not. When it is determined that the newly inputted ID data is not correct, it is determined whether the PIN code inputted from the keypad 38 is correct or not. When it is determined that the PIN code inputted from the keypad 38 is not correct, the number of JP chances associated with the original ID data stored in the RAM 43 is initialized. When it is determined that the PIN code inputted through the keypad 38 is correct, the newly inputted ID data is stored in the RAM 43, replacing the original ID data. Hence, when another player other than the player who has obtained a JP chance intends to play a game, it is possible to restrain another player from using the JP chances obtained by the previous player, and to enable only a player who correctly inputs the PIN code to continuously use the JP chances obtained by the previous player.

Moreover, as clearly seen from the above operations, the gaming terminal 10 realizes a control method including the step of: when the ID card 300 is removed from the card reader 36, generating a PIN code by the PIN code generating unit 128 and storing the PIN code in the RAM 43.

Thus, when the ID card 300 is removed, the PIN code is generated by the PIN code generation unit 128 and then stored in association with the ID data and the number of JP chances. Thus, the PIN code can be changed every time the ID card 300 is removed.

Moreover, as clearly seen from the above operations, the gaming terminal 10 realizes a control method including the steps of: when the ID card 300 is removed from the card reader 36, causing the count unit 123 to start measuring time, and when the ID card 300 is inserted into any one of the gaming terminals 10 in a predetermined period of time, causing the count unit to stop measuring time, and when the ID card 300 is not inserted in a predetermined period of time, initializing the number of JP chances stored in the RAM 43 of the gaming terminal 10 from which the ID card 300 has been removed.

Hence, when the ID card 300 has not been inserted into the card reader 36 of any one gaming terminal 10 in a predetermined period of time since the ID card 300 is removed, the number of JP chances obtained is initialized. Hence, even when a player quits a game without consuming the one or more JP chances obtained, it is possible to restrain another player from using the one or more JP chances.

(Operation of Center Controller 200)

The center controller 200 is structured to execute a twelfth process of obtaining JP chances and ID data from the gaming terminals 10; a thirteenth process of accumulatively storing, in a later-described JP chance storage unit 225, the number of JP chances, in association with the ID data for each of the gaming terminals 10; a fourteenth process of, when the number of JP chances stored in the center JP chance storage unit 225 equals or surpasses a predetermined number, running a JP game at a predetermined timing; a fifteenth process of determining a payout according to a result of the JP game; a sixteenth process of, when it is determined that newly inputted ID data to the card reader 36 of each of the gaming terminals 10 is not correct and that a PIN code associated with the number of JP chances and the ID data and inputted through the keypad 38 of the gaming terminal 10 is not correct, initializing the number of JP chances associated with the original ID data stored in the center JP chance storage unit 225; and a seventeenth process of, when it is determined that the newly inputted ID data is not correct and that the PIN code inputted through the keypad 38 is correct, storing the newly inputted ID data, replacing the original ID data stored in the center JP chance storage unit 225; and a eighteenth process of, when the number of JP chances associated with the newly inputted ID data is stored in the center JP chance storage unit 225, adding the number of JP chances associated with the newly inputted ID data, to the initialized number of JP chances of the gaming terminal 10 associated with the original ID data. In other words, the center controller 200 includes twelfth to eighteenth processing units.

As illustrated in FIG. 2, the center controller 200 is connected to terminal controllers 100 respectively provided in gaming terminals 10, and is in communication with each of the terminal controllers 110.

The center controller 200 includes: a JP game running unit 224, a JP game storage unit 223, a JP game screen storage unit 222, and a shared display control unit 221.

The JP game running unit 224 refers to the later-detailed center JP chance storage unit 225 at a predetermined time, so as to determine whether there is a gaming terminal having obtained a JP chance. If there is a gaming terminal 10 having obtained a JP chance, the JP game running unit 224 runs a JP game only for that gaming terminal 10. Further, the JP game running unit 224 outputs a JP game start signal only to a game running unit 103 of the terminal controller 100 provided in the gaming terminal 10 to run the JP game. Further, to end the JP game, the JP game running unit 224 outputs a JP game end signal to the game running unit 103 of the terminal controller 100 provided in the gaming terminal 10 having received the JP game start signal.

JP game storage unit 223 stores therein information regarding the JP game. The JP game screen storage unit 222 stores therein display information based on the information of the JP game stored in the JP game storage unit 223.

The shared display control unit 221, under the control of the JP game running unit 224, reads out the display information in the JP game screen storage unit 222, and causes the shared display 203 to perform displaying based on the display information.

Further, the center controller 200 includes: the time recorder 228, the center JP chance storage unit 225, the JP game payout determining unit 227, a progressive storage unit 226 and the center JP chance update control unit 230.

The time recorder 228 records the time of receiving a JP chance signal from the JP chance determining unit 106 provided in the terminal controller 100 of the gaming terminal 10, and then outputs a signal to the center JP chance storage unit 225.

The JP chance storage unit 225 is a functional unit of a later-detailed RAM 243. The center JP chance storage unit 225 then associates the time recorded by the time recorder 228 with the number of JP chances obtained by a gaming terminal 10 and the ID data, and accumulatively stores therein the time, the number and the ID data for each of the gaming terminals 10.

The JP game payout determining unit 227 determines whether to award a payout of a JP game, under the control of the JP game running unit 224. In other words, the JP game payout determining unit 227 determines whether the JP game has resulted in a jackpot. If the JP game payout determining unit 227 determines that the JP game has resulted in a jackpot, the JP game payout determining unit 227 determines an amount of payout based on a progressive value stored in the progressive storage unit 226. Note that the process of determining whether a JP game has resulted in a jackpot is sequentially performed, in order of time associated with a JP chance, which is stored in the center JP chance storage unit 225. That is, a payout of a JP game is determined, consuming JP chances obtained by one or more gaming terminals 10, in order of the time of obtaining the JP chances. Further, when the payout of the JP game is determined, a signal is output to the payout awarding unit 104 provided in the terminal controller 100 of the gaming terminal 10.

The progressive storage unit 226 stores and sums up a progressive value indicated by a progressive signal received from the terminal controller 100.

Upon receiving a center-side reset signal from the JP chance update control unit 120 provided to the terminal controller 100 of a gaming terminal 10, the center JP chance update control unit 230 determines a terminal number of a sender-side gaming terminal 10. Then, the center JP chance update control unit 230 initializes the number of JP chances stored in the center JP chance storage unit 225, in the gaming terminal 10 having the determined terminal number. In the meantime, as described above, the center-side reset signal is outputted from the JP chance update control unit 120 of the terminal controller 100 in the sender-side gaming terminal 10: after a predetermined period of time since the count unit 123 has been caused to start measuring time by the JP chance update control unit 120; when a player presses the reset button 310; or when it is determined that the newly inputted ID data to the card reader 36 is not correct, as a result of the comparison of the newly inputted ID data with the original ID data and that the PIN code inputted through the keypad 38 is not correct.

Further, upon receiving the succeeding ID information signal from the JP chance update control unit 120 of the terminal controller 100, the center JP chance update control unit 230 determines a terminal number of the sender-side gaming terminal 10. In addition, the center JP chance update control unit extracts the newly inputted ID data from the succeeding ID information signal. Then, in the gaming terminal 10 having the determined terminal number, the center JP chance update control unit stores the newly inputted ID data, replacing the original ID data stored in the center JP chance storage unit 225.

Further, regarding the new ID data information signal received from the JP chance update control unit 120, when the JP chance associated with the newly inputted ID data is stored in the center JP chance storage unit 225, in association with another gaming terminal 10, the center JP chance update control unit 230 moves the JP chance associated with the newly inputted ID data to the sender-side gaming terminal 10 and adds the JP chance thereto. That is, when a player moves from a first gaming terminal 10 to a second gaming terminal 10, the number of continuing JP chances obtained in the first gaming terminal 10 is moved to the second gaming terminal 10. At this time, the center JP chance update control unit outputs a JP chance succeeding signal including the information about the number of continuing JP chances to the JP chance update control unit 120 provided in the terminal controller 100. Further, the center JP chance update control unit outputs a terminal-side reset signal to the JP chance update control unit 120 provided to the first gaming terminal 10.

Note that each block of the center controller 200 may be realized with hardware or with software as needed.

(Operation of Center Controller 200)

The following describes an operation of the center controller 200 in the above structure. First, the time recorder 228 receives a JP chance signal from the JP chance determining unit 106 provided in the terminal controller 100 of a gaming terminal 10. That way, the center controller 200 obtains information related to the number of JP chances obtained by the gaming terminal 10. Moreover, the center JP chance update control unit 230 receives a new ID data information signal from the JP chance update control unit 120 provided to the terminal controller 100. Hence, the center controller 200 obtains the information about the ID data inputted to the card reader 36 provided to the gaming terminal 10. Like this, the center controller 200 performs the twelfth process of obtaining JP chances and ID data from the gaming terminals 10.

The center JP chance storage unit 225 accumulatively stores therein the number of JP chances obtained by a gaming terminal 10, in association with the time recorded by the time recorder 228 and the ID data, for each of the gaming terminals 10. Like this, the center controller 200 performs the thirteenth process of accumulatively storing, in the later-described center JP chance storage unit 225, the number of JP chances obtained, in association with the ID data, for each gaming terminal 10.

Meanwhile, the JP game running unit 224 checks the center JP chance storage unit 225 to determine if there is a gaming terminal 10 having obtained a JP chance. When there is a gaming terminal 10 having obtained a JP chance, a JP game is run only for the gaming terminal 10 having obtained the JP chance. Like this, the center controller 200 performs the fourteenth process of running a JP game at a predetermined timing when the number of JP chances stored in the center JP chance storage unit 225 equals or surpasses a predetermined number.

Further, the JP game payout determining unit 227 determines whether a JP game has resulted in a jackpot based on the result of the JP game. This operation sequentially consumes at least one of JP chances obtained by a gaming terminal 10, in order of the times of obtaining the JP chances. If it is determined that a JP game has resulted in a jackpot, the JP game payout determining unit 227 determines a payout according to a progressive value stored in the progressive storage unit 226. Like this, the center controller 200 performs the fifteenth process of determining a payout according to a result of the JP game.

Further, upon receiving a center-side reset signal from the JP chance update control unit 120 provided to the terminal controller 100 of a gaming terminal 10, the center JP chance update control unit 230 determines a terminal number of a sender-side gaming terminal 10 and initializes the number of JP chances stored in the center JP chance storage unit 225. Like this, the center controller 200 performs the sixteenth process of, when it is determined that newly inputted ID data to the card reader 36 of each of the gaming terminals 10 is not correct, and that the PIN code associated with the number of JP chances and the ID data, which is inputted through the keypad 38 of the gaming terminal 10 is not correct, initializing the number of JP chances associated with the original ID data stored in the center JP chance storage unit 225.

In addition, when the center JP chance update control unit 230 receives the succeeding ID information signal from the JP chance update control unit 120 of the terminal controller 100, a terminal number of the sender-side gaming terminal 10 is determined, and the newly inputted ID data is extracted. Then, the JP chance update control unit 120 stores the newly inputted ID data, replacing the original ID data stored in the center JP chance storage unit 225. Like this, the center controller 200 performs the seventeenth process of, when it is determined that the newly inputted ID data is not correct and that the PIN code inputted from the keypad 38 is correct, storing the newly inputted ID data, replacing the original ID data stored in the center JP chance storage unit 225.

In addition, regarding the new ID data information signal received from the JP chance update control unit 120, the center JP chance update control unit 230 moves and adds the JP chance associated with the newly inputted ID data to the sender-side gaming terminal 10, when the number of JP chances associated with the ID data newly inputted is stored in the center JP chance storage unit 225, in association with another gaming terminal 10. Like this, the center controller 200 performs the eighteenth process of, when the number of JP chances associated with the ID data newly inputted is stored in the center JP chance storage unit 225, adding the number of JP chances associated with the ID data newly inputted to the initialized number of JP chances of the gaming terminal 10.

With the structure and the operation thereof described with reference to FIG. 2, one or more gaming terminals 10 run a base game, and at the same time, run a chance game offering a chance of winning a JP chance which qualifies a player to join a JP game offering a chance of winning a higher payout than the base game. Then, the player is awarded a payout according the result of the base game, and is given zero or more chance flags according to the result of the chance game. The number of JP chances awarded is accumulatively stored in the later-detailed RAM 243. When this number equals or surpasses a predetermined number, the center controller 200 runs the JP game. Further, the center controller 200 determines a payout according to a result of the JP game, and the payout determined by the center controller 200 is awarded by the terminal controller 100 of the targeted gaming terminal 10. This structure allows a player to play the chance game while he/she plays the base game, and allows the player to obtain zero or more JP chances which are given according to a result of the chance game. Accordingly, the player is able to know the result of the chance game while enjoying the base game. This realizes a higher level of gaming characteristic than a gaming machine which independently runs a chance game inside the gaming terminal 10 where a player is not able to see. Further, the shared display 203 allows players to play the special game at the same time. With this, the players may be able to share the feeling while enjoying the special game.

Further, according to the structure and operation of the gaming machine 1 described with reference to FIG. 2, when the number of JP chances associated with the ID data newly inputted from the card reader 36 is stored in the RAM 243, the number of JP chances can be added to the initialized number of JP chances of the gaming terminal 10. Thus, it is possible to enable even a player who has moved to another gaming terminal 10 to continuously use the one or more JP chances s/he has obtained. Thus, the player is able to select a gaming terminal 10 more freely.

In addition, according to the structure and operation of the gaming machine 1 described with reference to FIG. 2, when the ID card 300 is not inserted into the card reader 36 of any one gaming terminal 10 in a predetermined period of time since the ID card 300 has been removed from the card reader 36, the number of JP chances obtained is initialized. Hence, even when a player quits a game without consuming the one or more JP chances s/he has obtained, it is possible to restrain another player from using the JP chances.

(Display State of Terminal Display 101)

The following details an exemplary display state of the terminal display 101 during the operations of the gaming machine 1 and the playing method thereof. Note that the following example deals with a case where the terminal display 101 adopts a video reel and arranges symbols on a video reel in the form of an image, as illustrated in FIG. 3.

As illustrated in FIG. 3, a matrix 156 is in the center of the terminal display 101. The matrix 156 includes a symbol column having symbols 180 and a symbol column having JP symbols 180, which columns overlap each other. Further display windows 151 to 155 are each divided into an upper stage 151*a*, a middle stage 151*b*, and a lower stage 151*c*. The base symbols 180 and the JP symbols 180 are stopped (arranged) in each of the stages 151*a* to 151*c* so that a base symbol 180 overlaps a JP symbol 180J. For example, in FIG. 3, a "Clownfish" which is a base symbol 180 is stopped in a base symbol arrangement area 150 in the upper stage 151*a* of the display window 151, and a "GET" which is a JP symbol 180J is stopped in the JP symbol arrangement area 150*b* so as to overlap the "Clownfish". Further, a "Coelacanth" is stopped in the base symbol arrangement area 150*a* in the middle stage 151*b* of the display window 151, and no symbol is stopped in the JP symbol arrangement area 150*b* overlapping the "Coelacanth". Further, a "Clownfish" is stopped in the base symbol arrangement area 150*a* in the bottom stage 151*c* of the display window 151, and no symbol is stopped in the JP symbol arrangement area 150*b* overlapping the "Clownfish". In short, the matrix 156 is a symbol matrix including five columns/three rows. The matrix 156 however is not limited to the one with the five-columns/three-rows.

Further, the JP chance display area 160 is disposed upper right of the terminal display 101, and displays thereon the number of JP chances having obtained. For example, in FIG. 3, the number of JP chances is "1". As such, a player is able to join the JP game only once to be subjected to a process of determining whether a payout is awarded.

The base symbols 180 and the JP symbols 180J are arranged so that a base symbol overlaps a JP symbol 180J as illustrated in the upper part of FIG. 3, when the base game and the chance game are run at the same time. A player usually plays a game, viewing a screen displayed according to the display state illustrated in the upper part of the figure.

At the lower left of the figure is provided an illustration of displayed elements related to a base game. In the base game are arranged base symbols 180. In the case of FIG. 3, the matrix 156 includes a predetermined number (three in the present embodiment) or more of "Coelacanth" each of which is a scatter symbol of the base game in the present embodiment. Thus, the base game has resulted in a winning in the case of FIG. 3.

At the lower right of the figure is provided an illustration of displayed elements related to a chance game. In a chance game are arranged JP symbols 180J. In the case of FIG. 3, the matrix 156 presents a predetermined number (three in the present embodiment) or more of "GET". The chance game in this case therefore has resulted in a winning, and "1" is added to the number of JP chance. As the result, the JP chance display area 160 displays "2".

This displaying state allows allows the player to play the chance game while he/she plays the base game, and allows the player to obtain zero or more JP chances according to a result of the chance game. Accordingly, the player is able to know the result of the chance game while enjoying the base game. This realizes a higher level of gaming characteristic than a gaming machine which independently runs a chance game inside the gaming terminal 10 where a player is not able to see. Further, the number of JP chances obtained in a chance game is displayed in the JP chance display area 160 of the terminal display 101 during a base game. This may allow the player to play the base game while letting him/her know the number of JP chances. Thus, the above structure may motivate the player to continuously play games for a longer period of time.

(Display State of Shared Display 203)

The following details an exemplary display state of the shared display 203 during the operations of the gaming machine 1 and the playing method thereof. As illustrated in FIG. 4, JP game is viewed on the shared display 203 by players of gaming terminals 10 which are respectively given a terminal number A, a terminal number B, a terminal number C, and a terminal number D. JP game is run at a predetermined timing. The JP game however is not run for a gaming terminal 10 having no JP chances. For example, in the case of FIG. 4, a JP game is not run in the gaming terminal 10 with the terminal number C, and a base game is displayed on the terminal display 101 of the terminal number C. On the other hand, the JP game is run for other three gaming terminals 10 with the terminal numbers A, B, and D. Further, in FIG. 4, the gaming terminal 10 with the terminal number B has won a jackpot, and that win is displayed on the shared display 203.

Further, the shared display 203 allows players to play the special game at the same time. With this, the players may be able to share the feeling while enjoying the special game. Further, the JP game is run only for the gaming terminal 10 having at least a predetermined number of JP chances. Thus, a player who has won a predetermined number or more of JP chances is able to play the JP game, and another player who has not earned the predetermined number of JP chances is able to continue the base game. This may be advantageous in that the other player is able to enjoy continuing the base game without his/her pace being interrupted.

(Symbol, Combination, or the Like)

A terminal display 101 has a matrix 156 including symbol columns each having twenty two base symbols 180 as illustrated in FIG. 5. To each of the symbols constituting the columns is given one of code numbers 0 to 21. Each of the symbol columns has a combination of symbols including "Angelfish", "Clownfish", "7", "Tuna", "Coelacanth", and "BONUS".

Of the symbols in the symbol columns, the display windows 151 to 155 each displays (arranges) three successive symbols. The symbols arranged in the upper stage 151*a*, the middle stage 151*b*, and the lower stage 151*c* form a symbol matrix having five columns and three rows. When a BET button and a start button are sequentially pressed in this order to start a game, symbols constituting the symbol matrix start to scroll. This scrolling of the symbols stops (rearrangement) after a predetermined period from the beginning of the scrolling.

Further, for each symbol, a predetermined scatter symbol is determined in advance. Scatter symbols are such symbols that a player is put in an advantageous position when a predetermined number or more of them are displayed in the matrix 156. For example, the advantages includes: a state where coins corresponding to the scatter symbols are paid out, a state where the number of coins to be paid out is added to a credit, a state where a bonus game is started.

To be more specific, when three or more symbols of "BONUS" are rearranged in the matrix 156, a bonus is triggered and a gaming state shifts from a base game to a bonus game. Further, when four or more "BONUS" are displayed in the matrix 156, twenty coins (game medium) are paid out for one bet.

Here, a bonus game is a gaming state which provides a larger advantage than a base game. In this embodiment, the bonus game is a free game. The free game is a game allowing a player to play a game a predetermined number of times without betting a coin. No particular limitation is put on the bonus game, as long as it is a gaming state advantageous to the player, that is, it is more advantageous than the base game. For example, the bonus game may include a state where more game media are obtainable than in the base game, a state where a game medium is obtainable with higher probability than in the base game, a state where a game medium is less consumed than in the base game, and the like. Specifically, a free game, a second game, a feature game, and the like may be mentioned as examples of the bonus game.

(Mechanical Structure of Gaming Machine 1)

Next, the following describes a specific example of mechanical and electrical structures of the gaming machine 1 thus structured.

A gaming machine 1 is placed in a gaming facility such as a casino. This gaming machine 1 runs a unit game which involves a game medium. The game medium is a coin, bill, or a value in the form of electronic information. However, the game medium in the present invention is not particularly limited. For example, a medal, token, electronic money, ticket or the like are also possible. Further, the ticket is not particularly limited and may be a later-detailed ticket with a barcode or the like ticket.

Figure 6:
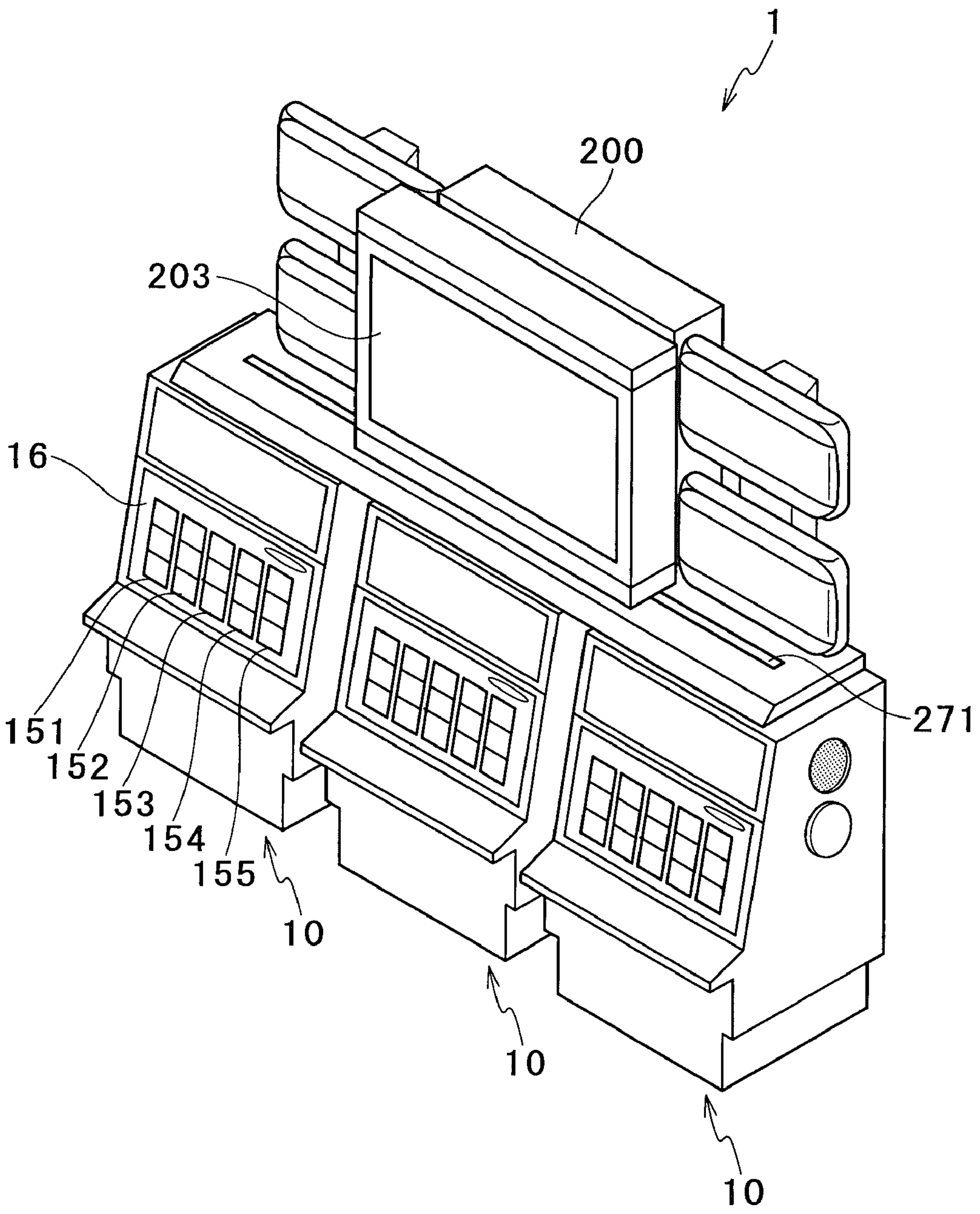
FIG. 6 is a perspective view illustrating an external appearance of the gaming machine.

As illustrated in FIG. 6, the gaming machine 1 includes: gaming terminals 10 which run a base game independently from each other; a center controller 200 connected to the gaming terminals 10, which is in communication with the gaming terminals 10 and runs a JP game; a shared display 203 which displays thereon an effect image related to the JP game; a rail 271 which supports the shared display 203 and allows the shared display 203 to move to a position immediately above one of the gaming terminals 10; and a not-illustrated drive motor 270 which causes the shared display 203 to move along the rail 271.

Figure 7:
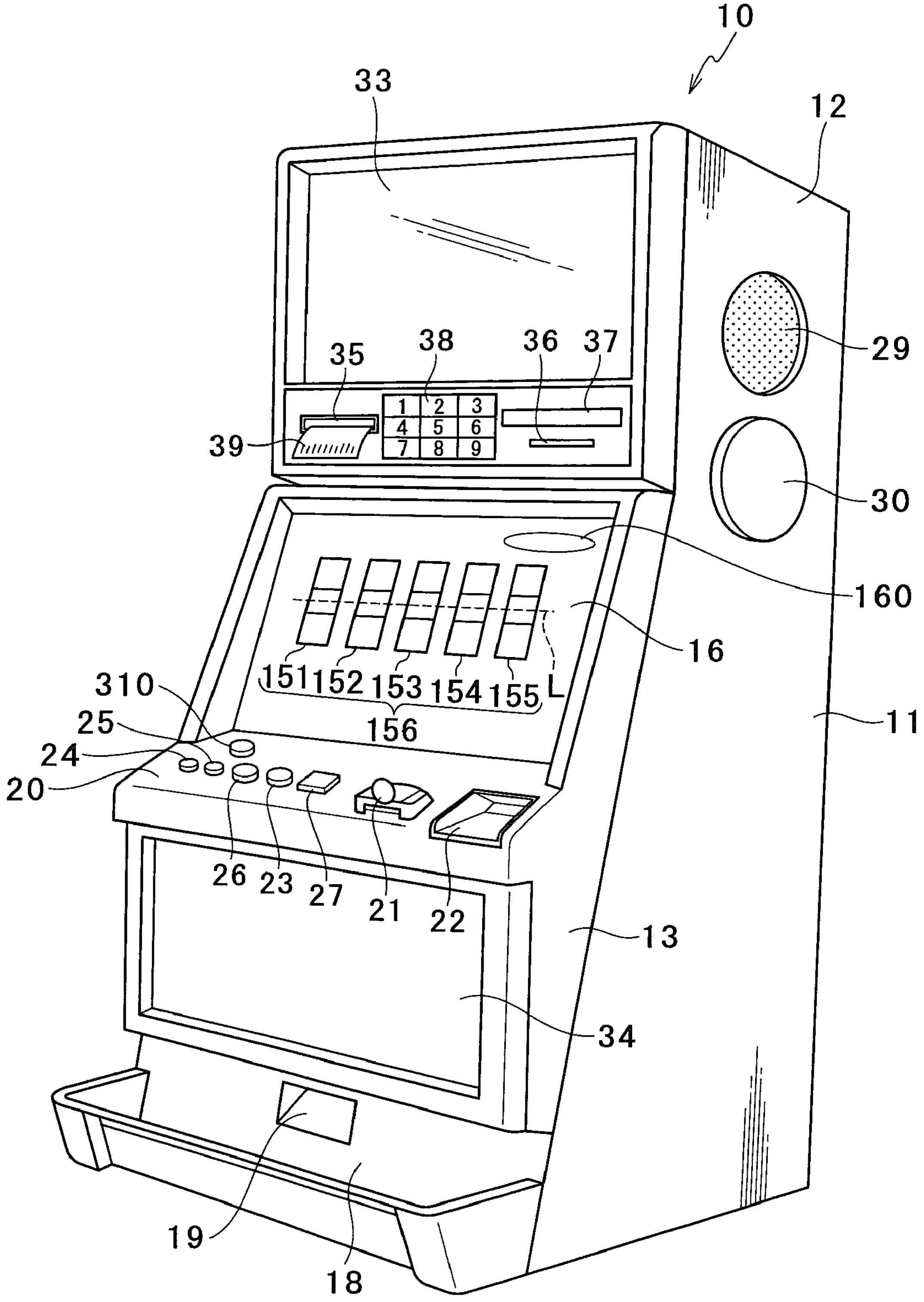
FIG. 7 is a perspective view illustrating an external appearance of the gaming terminal.

As illustrated in FIG. 7, the gaming terminal 10 includes: a cabinet 11, a top box 12 provided above the cabinet 11, and a main door 13 provided on the front surface of the cabinet 11. The main door 13 has a lower image display panel 16. The lower image display panel 16 has a transparent liquid crystal panel for displaying various information. The lower image display panel 16 displays display windows 151 to 155 (matrix 156) for arranging therein base symbols 180. Further, the lower image display panel 16 displays as needed various information and effect images related to a game. Further, at the upper right of the lower image display panel 16 is displayed a JP chance display area 160. That is, the lower image display panel 16 is a terminal display 101 in FIG. 2.

The present embodiment deals with a case where the lower image display panel 16 electrically displays base symbols 180 and JP symbols 180J arranged in five rows/three columns so that a base symbol 180 overlaps a JP symbol 180J. However, the present invention is not limited to this.

The lower image display panel 16 displays a single activated pay line L. The "pay line L" is used for determining a combination of the base symbols 180. That is, when base symbols 180 are rearranged on and out of the pay line L, a combination is determined for only the base symbols 180 rearranged on the pay line. When the combination is recognized as a winning combination, There is performed a process such as awarding of a coin according to the winning combination or the like. Note that the number of pay lines L may be two or more. When the number of pay lines L is two or more, the number of pay lines L activated may be determined according to a predetermined condition, such as the number of coins placed as a BET.

Note that the lower image display panel 16 may have a credit value indicator and a payout value indicator. The credit value indicator displays a total value (hereinafter also referred to as total credit value) which a gaming terminal 10 can pay out to a player. When symbols stopped along a pay line L form a winning combination, the payout value indicator displays the number of coins to be paid out.

Further, scatter symbols may be adopted, and the number of coins to be paid out may be determined, according to the number of scatter symbols displayed on the matrix 156. Note that the pay line L does not necessarily have to be displayed.

Below the lower image display panel 16 provided are a control panel 20, a coin insertion slot 21, and a bill validator 22. The control panel 20 is provided with various buttons 23 to 27. These buttons 23 to 27 allow a player to input instructions related to a game played by the player. Through the coin insertion slot 21, a coin is received in the cabinet 11.

The control panel 20 includes: a spin button 23, a change button 24, a cashout button 25, a 1-BET button 26, a maximum BET button 27 and a reset button 310. The spin button 23 is for inputting an instruction to start symbol scrolling. The change button 24 is used to ask a staff person in the gaming facility for exchange of money. The cash out button 25 is for inputting an instruction to pay out coins corresponding to the total credit-value into the coin tray 18, via a coin payout opening 19. The reset button 310 is for initializing the number of JP chances obtained by a player by pressing it.

The 1-BET button 26 is used for betting two coins out of those corresponding to the total credit value. The maximum BET button 27 is used for betting, out of those corresponding to the total credit value, a maximum number of coins (e.g., fifty coins) which can be bet in one game.

Of the two coins bet by pressing of the 1-BET button 26 once, one is placed as a bet for a base game, and the other serves as a source of a payout of a JP game. In short, the player is making a bet for the JP game while making a bet for the base game.

The bill validator 22 validates whether bill is genuine or not and receives the genuine bill into the cabinet 11. Note that the bill validator 22 is capable of reading a barcode attached to the later-detailed ticket 39 having a barcode (hereinafter simply referred to as ticket 39). When the bill validator 22 reads the ticket 39, it outputs to the main CPU 41 a read signal representing information having read from the barcode.

On the lower front surface of the main door 13, that is, below the control panel 20, a berry glass 34 is provided. On the belly glass 34, a character of a gaming terminal 10 or the like is drawn. On the front surface of top box 12 is provided an upper image display panel 33. The upper image display panel 33 has a liquid crystal panel and displays an effect image, introduction to the game, rules of the game, or the like.

The upper image display panel 33 displays the generated PIN code when the ID card 300 is removed from the card reader 36. In addition, the upper image display panel 33 displays a message to urge a player to input a PIN code when the ID data newly inputted to the card reader 36 is not correct. In short, the upper image display panel 33 is an upper terminal display 130 in FIG. 2.

Further, the top box 12 has a speaker 29 for performing an audio output and a lamp 30. Below the upper image display panel 33 are provided a ticket printer 35, a card reader 36, a data displayer 37, and a keypad 38. The ticket printer 35 prints, on to a ticket, a barcode having encoded data containing credit-value, date and time, identification number of a gaming terminal 10 or the like, thereby issuing a ticket 39 having a barcode attached thereto. A player can play a game in another gaming terminal 10 with the ticket 39 having the barcode, or exchange the ticket 39 having the barcode with bill or the like at a change booth or the like of the game arcade.

The card reader 36 serves as the ID data receiving unit 125 in FIG. 2. The card reader 36 reads/writes data from/into the ID card 300.

The data displayer 37 includes a fluorescent display or the like, and displays the data read by the card reader 36 and the data input by the player through the keypad 38.

The keypad 38 serves as the PIN code receiving unit 126 in FIG. 2. The keypad 38 is for entering instructions or data relating to issuing of a ticket, a PIN code or the like.

(JP Chance Data Table)

Figure 8:
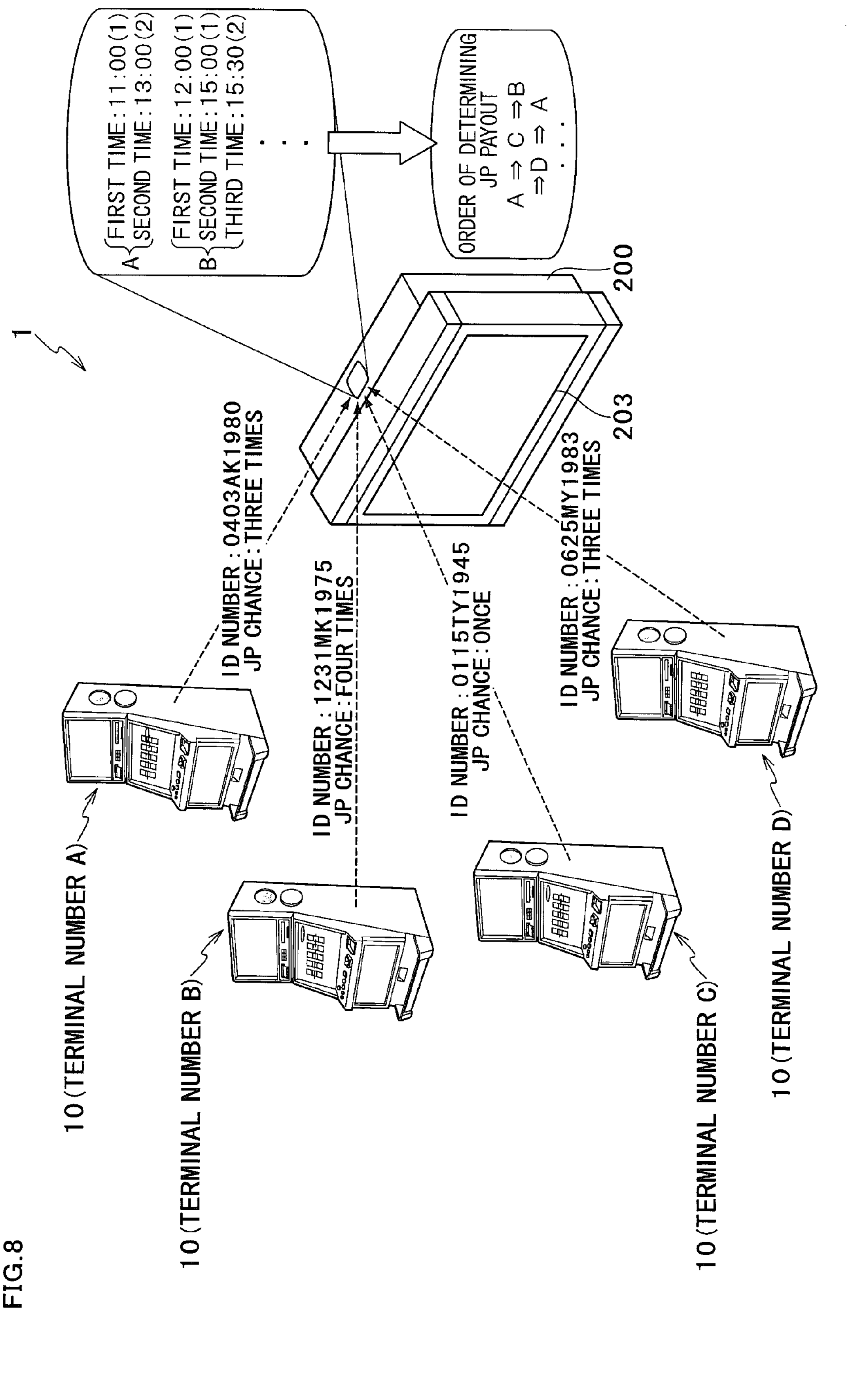
FIG. 8 is a diagram illustrating a structure of the gaming terminal and the shared display.

The center controller 200 of the gaming machine 1 has a JP chance data table as illustrated in FIG. 9. As illustrated in FIG. 8, the JP chance data table stores information obtained by the center controller 200. The information includes the number of JP chances obtained in a chance game run in a gaming terminal 10, the ID data of a player having obtained the JP chances and a time of obtaining the JP chances. In the present embodiment, the table indicates that a player having an ID number "0403 AK1980" has obtained "one JP chance" for the first time "at 11:00", and "two JP chances" for the second time "at 13:00", in a gaming terminal 10 having a terminal number A. The table further indicates that a player having an ID number "1231 MK1975" has obtained "one JP chance" for the first time "at 12:00", "one JP chance" for the second time "at 15:00" and "two JP chances" for the third time "at 15:30", in a gaming terminal 10 having a terminal number B. The center controller 200 administrates the number of JP chances and time of obtaining the JP chances, for each of the gaming terminal 10, thereby allowing the JP chances to be consumed at the time of determining a payout in order of obtaining the JP chances. Thus, by determining payouts for players in such a manner that a player who is entitled to a payout awarding earlier than another receives a higher payout, it may be possible to keep the enthusiasm of players to obtain JP chances earlier than the others.

The center controller 200 in the present embodiment initializes the number of JP chances associated with the original ID data stored in the later-detailed RAM 243, when it is determined that the ID data newly inputted to the card reader 36 of a second gaming terminal 10 is not correct, when a player moves to the second gaming terminal 10, and also when it is determined that the PIN code inputted through the keypad 38 is not correct. On the other hand, when it is determined that the PIN code inputted through the keypad 38 is correct, the center controller re-writes the original ID data stored in the RAM 243 to the ID data newly inputted. For example, in the JP chance data table of FIG. 9, it is assumed that a player having an ID number "0403 AK1980" has moved to a gaming terminal 10 having a terminal number "C" from a gaming terminal 10 having a terminal number "A." In this case, the ID number of the player having moved is not identical to the ID number "0115 TY1945" of the previous player who had played a game in the gaming terminal 10 having a terminal number C. Further, when it is determined that the PIN code inputted by the player having moved to the gaming terminal 10 is not correct, the obtaining time and number of JP chances associated with the ID number of the previous player who had played a game in the gaming terminal 10 having a terminal number C are deleted. On the other hand, when it is determined that the PIN code inputted by the player having moved to the gaming terminal 10 is correct, the ID number "0403 AK1980" of the player having moved is stored, replacing the ID number "0115 TY1945" of the original player.

Moreover, the center control in the present embodiment adds the number of JP chances associated with the newly inputted ID data to the initialized number of JP chance of the gaming terminal 10, when the number of JP chances associated with the ID data newly inputted to the second gaming terminal 10 is stored in the RAM 243. For example, in the JP chance data table of FIG. 9, it is assumed that a player having an ID number "0403 AK1980" has moved to a gaming terminal 10 having a terminal number C from a gaming terminal 10 having a terminal number A. As described above, in this case, the obtaining time and number of JP chances associated with the ID number of the previous player who played a game in the gaming terminal 10 having a terminal number C are deleted. However, the JP chances associated with the ID number of the player having moved still exist, associated with the gaming terminal 10 having a terminal number A. Accordingly, the JP chances associated with the ID number of the player having moved are moved to the gaming terminal 10 having a terminal number C from the gaming terminal 10 having a terminal number A. That is, the information indicating that one JP chance associated with the ID number "0403 AK1980" has been obtained "at 11:00" and "two JP chances" has been obtained "at 13:00" is moved to the gaming terminal 10 having a terminal number C from the gaming terminal 10 having a terminal number A.

(Electrical Structure of Gaming Machine 1)

Figure 10:
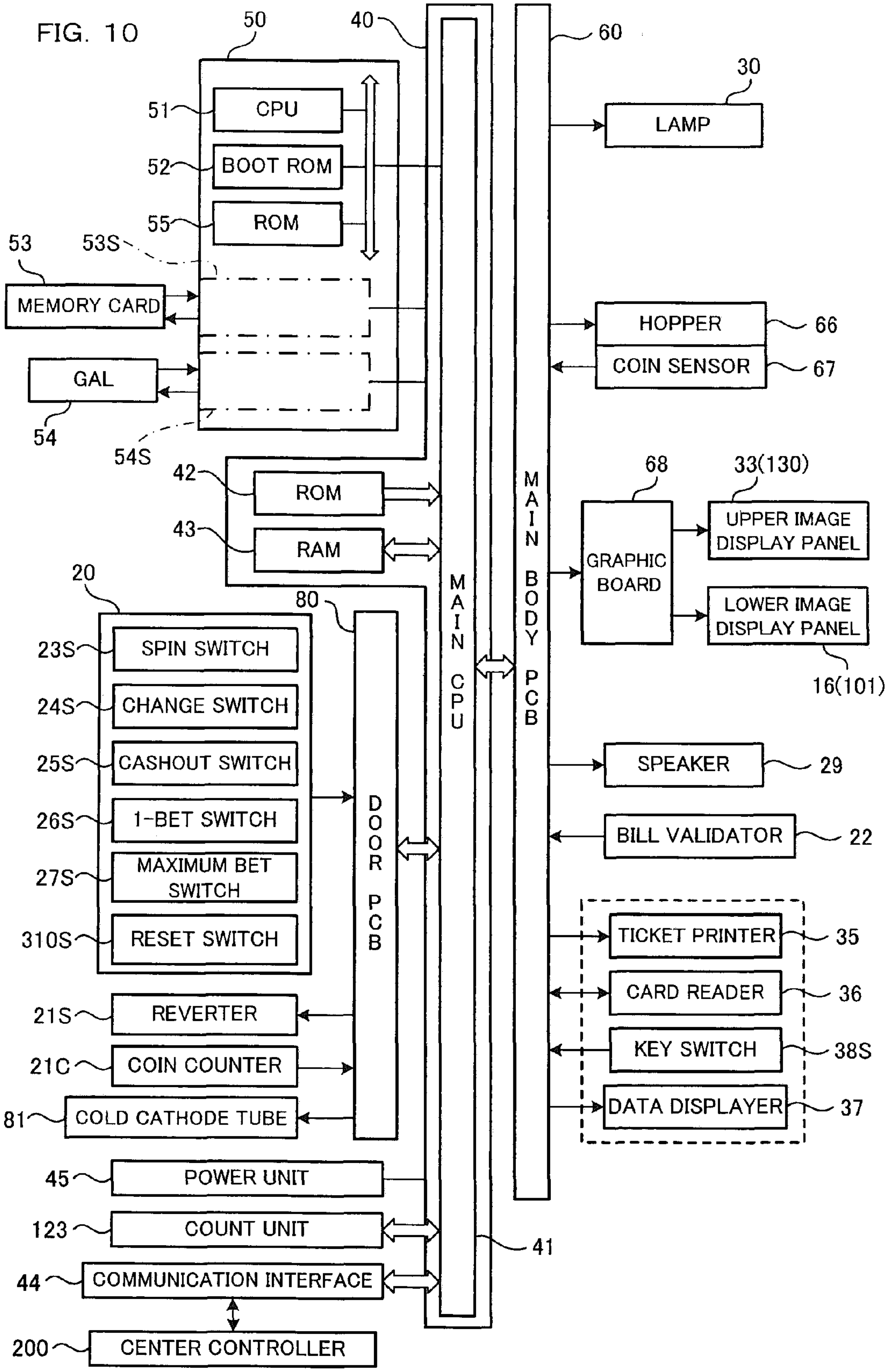
FIG. 10 is a block diagram illustrating an electrical structure of the gaming terminal.
Figure 11:
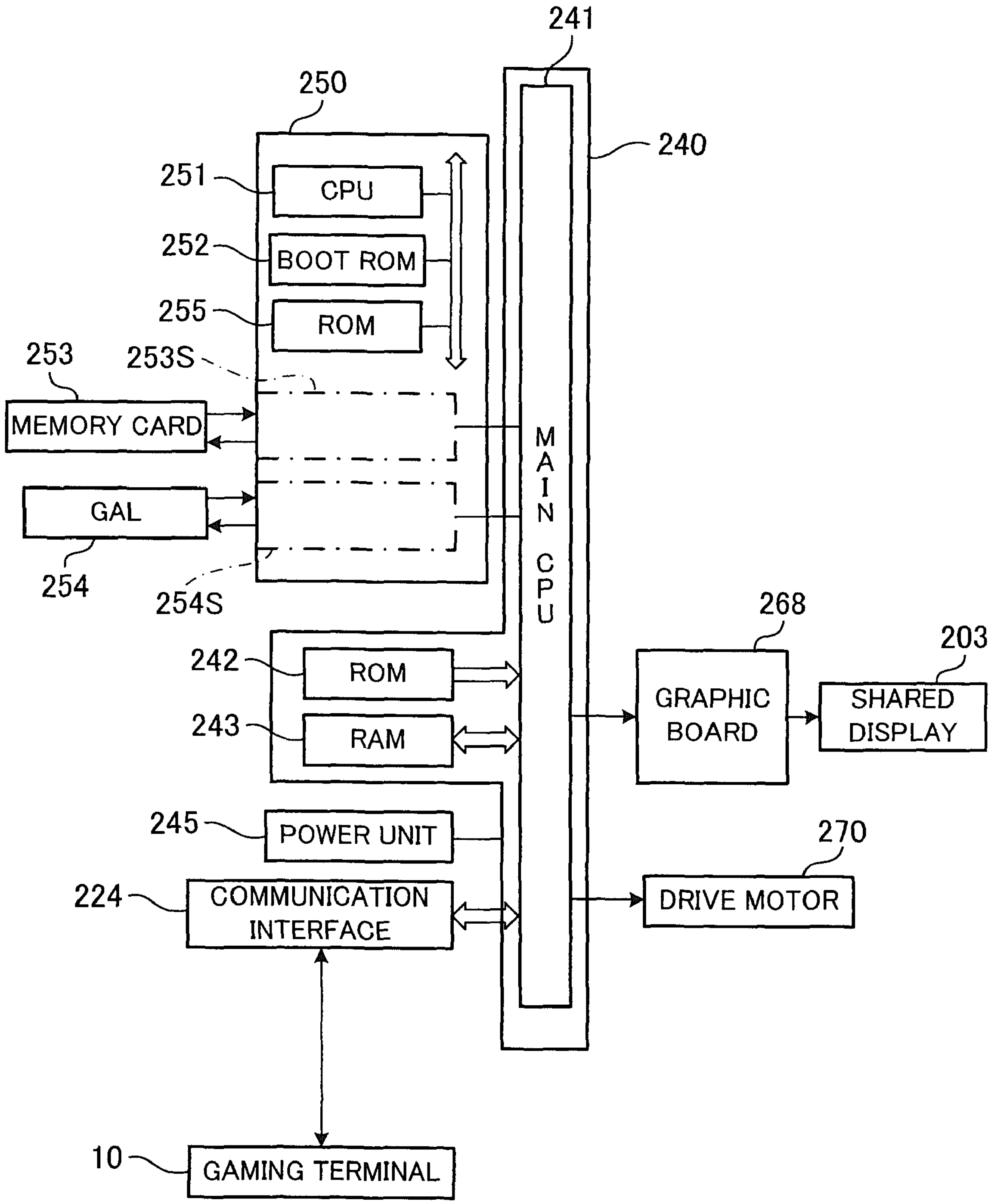
FIG. 11 is a block diagram illustrating an electrical structure of a center controller.

FIGS. 10 and 11 are block diagrams each illustrating an electrical structure of the entire gaming machine 1.

(Electrical Structure of Gaming Terminal 10)

FIG. 10 is a block diagram illustrating an electrical structure of the gaming terminal 10. As illustrated in FIG. 10, the cabinet 11 includes a control unit having a terminal controller 100. The control unit includes a motherboard 40, a main body PCB (Printed Circuit Board) 60, a gaming board 50, a door PCB 80, various switches, sensors, or the like.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein a game program and a game system program. The game program contains a stop symbol determining program. The stop symbol determining program is a program for determining: base symbols 180 (code numbers corresponding to the symbols) to be stopped in the base symbol arrangement area 150*a*; and JP symbols 180J (code numbers corresponding to the symbols) to be stopped in the JP symbol arrangement area 150*b*. This stop symbol determining program contains sets of symbol weighting data respectively corresponding to various payout rates (e.g., 80%, 84%, 88%). Each set of the symbol weighting data indicates, for each of the display windows 151 to 155, a code number of each symbol and at least one random numerical value allotted to the code number. The numerical value is a value within a predetermined range of 0 to 256 for example.

The payout rate is determined based on payout rate setting data output from the GAL 54. Based on a set of the symbol weighting data corresponding to the payout rate determined, a symbol to be stopped is determined.

The memory card 53 stores therein various types of data for use in the game programs and the game system programs. For example, the memory card 53 stores a table listing combinations of a base symbol 180 to be displayed on the display windows 151 to 155 of FIG. 1 and an associated range of random numerical values. This data is transferred to the RAM 43 of the motherboard 40, at the time of running a game programs.

The card slot 53S is structured so as to allow the memory card 53 to be attached/detached to/from the card slot 53S. This card slot 53S is connected to the motherboard 40 through an IDE bus. Thus, the type and content of a game run by a gaming terminal 10 can be modified by detaching the memory card 53 from the card slot 53S, write a different game program and a different game system program into the memory card 53, and inserting the memory card 53 back into the card slot 53S.

Each of the game programs includes a program related to the progress of the game and/or a program for causing a transition to a bonus game. Each of the game programs includes image data and audio data output during the game.

The GAL 54 has input and output ports. When the GAL 54 receives data via the input port, it outputs data corresponding to the input data from its output port. This data from the output port is the payout rate setting data described above.

IC socket 54S is structured so as to allow the GAL 54 to be attached/detached to/from the IC socket 54S. The IC socket 54S is connected to the motherboard 40, via a PCI bus. Thus, the payout rate setting data to be output from GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller 100), a ROM (Read Only Memory) 42, and a RAM (Random Access Memory) 43.

The main CPU 41 serves as a terminal controller 100 and has a function of controlling the entire gaming terminal 10. In particular, the main CPU 41 controls the following operations: an operation of outputting a signal instructing variable-displaying of symbols 180 to the graphic board 68, which is performed in response to pressing of the spin button 23 after betting of credit; an operation of determining symbols 180 to be stopped after the variable-displaying of symbols 180; and an operation of stopping the symbols 180 thus determined in the display window 151 to 155.

In other words, the main CPU 41 serves as an arrangement controller which arranges symbols to form a new symbol matrix through scrolling of symbols displayed on the lower image display panel 16. This main CPU 41 therefore determines symbols to be arranged in a symbol matrix by selecting symbols to be arranged from various kinds of symbols. Then, the main CPU 41 executes arrangement control to stop scrolling the symbols to present the symbols thus determined.

The main CPU 41 serves as a terminal controller 100 In FIG. 2. That is, the main CPU 41 serves as: the game running unit 103 of FIG. 2, the display control unit 102, the base game payout determining unit 105, the JP chance determining unit 106, the payout awarding unit 104, the JP chance update control unit 120, the ID data comparison unit 121, the reset payout unit 122, the PIN code generation unit 128 and the PIN code comparison unit 127.

The ROM 42 stores a program such as BIOS (Basic Input/Output System) run by the main CPU 41, and permanently-used data. When the BIOS is run by the main CPU 41, each of peripheral devices is initialized and the game program and the game system program stored in the memory card 53 are read out through the gaming board 50.

The RAM 43 stores data or a program used for the main CPU 41 to perform a process. For example, RAM 43 has the symbol storage unit 108 of FIG. 2, the JP chance storage unit 109, and the display storage unit 107, in the form of data area. Then, in the data area of the symbol storage unit 108 are stored base symbols 180 and JP symbols 180J. The number of JP chances obtained is accumulatively stored in the data area of the JP chance storage unit 109 with being associated with the ID data and the PIN code. In the data are of the display storage unit 107 are stored base symbols 180 and JP symbols 180 to be displayed, the number of the JP chances to be displayed and characters to be displayed of message to urge a player to input a PIN code."

Further, the main CPU 41 is connected to a communication interface 44. The communication interface 44 is provided to communicate with a host computer and the like equipped in the gaming facility, through the network (communication line). The communication interface 44 is also for communicating with the center controller 200 through a communication line. Further, the main CPU 41 is connected to the count unit 123. The count unit 123 is for measuring time under control of the main CPU 41. Further, a main body PCB (Printed Circuit Board) 60 and a door PCB 80 are connected to the motherboard 40, through a USB (Universal Serial Bus). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by signals from the main CPU 41. Based on a signal input to the main CPU 41, the main CPU 41 runs the game program and the game system program stored in the RAM 43, to perform an arithmetic process. Then, the CPU 41 stores the result of the arithmetic process in the RAM 43, or transmits a control signal to the various devices and units to control them based on the result.

The main body PCB 60 is connected with a lamp 30, a hopper 66, a coin sensor 67, a graphic board 68, a speaker 29, a bill validator 22, a ticket printer 35, a card reader 36, a key switch 38S, and a data displayer 37.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41.

The coin sensor 67 is provided inside the coin outlet 19, and outputs a signal to be input to the main CPU 41 upon sensing that a predetermined number of coins have been delivered from the coin outlet 19.

The graphic board 68 controls image displaying of upper image display panel 33 and the lower image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on the bill and takes only those recognized as to be genuine into the cabinet 11. When taking in a genuine bill, the bill validator 22 outputs an input signal indicating the value of the bill to the main CPU 41. The main CPU 41 stores into the RAM 43 a credit-value corresponding to the value of the bill indicated by the signal.

The ticket printer 35 prints a barcode on to a ticket to issue a ticket 39 having the barcode. The barcode contains encoded data such as credit-value stored in the RAM 43, date and time, identification number of the gaming terminal 10, or the like, based on a control signal from the main CPU 41.

The card reader 36 detects that the ID card 300 possessed by each player is inserted and separated, and reads out and receives the ID data when the ID card 300 is inserted. In addition, when the ID data is received, the card reader 36 transmits a signal to the main CPU 4. Moreover, the card reader 36 writes data to the ID card 300, under control of the main CPU 41. In short, the card reader 36 serves as the ID data receiving unit 125 of FIG. 2. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the key pad 38.

The door PCB 80 is connected to a control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-BET switch 26S associated with the 1-BET button 26; and a maximum BET switch 27S associated with the maximum BET button 27. Each of the switches 23S to 27S outputs a signal to the main CPU 41, when a player presses the associated one of buttons 23 to 27.

Further, the door PCB 80 is provided with a reset switch 310S corresponding to the reset button 310. The reset switch 310S outputs a reset pressed signal to the main CPU 41, when a player presses the reset button 310. In short, the reset switch 310S serves as the reset unit 124 of FIG. 2.

The coin counter 21C is provided within the coin insertion slot 21, and identifies whether the coin inserted into the coin insertion slot 12 by the player is genuine. A coin except the genuine coin is discharged from the coin outlet 19. In addition, the coin counter 21C outputs an input signal to the main CPU 41 upon detection of a genuine coin.

The reverter 21S is operated on the basis of the control signal output from the main CPU 41 and distributes a coin, which is recognized as a genuine coin by the coin counter 21C, to a not-illustrated cash box or hopper 66 mounted in the gaming terminal 10. In other words, when the hopper 66 is full of the coins, the genuine coin is distributed into the cash box by the reverter 21S. On the other hand, when the hopper 66 is not yet full with the coins, the genuine coin is distributed into the hopper 66. The cold cathode tube 81 functions as a backlight mounted to rear sides of the lower image display panel 16 and the upper image display panel 33. This cold cathode tube 81 turns on according to a control signal from the main CPU 41.

(Electrical Structure of Center Controller 200)

FIG. 11 is a block diagram illustrating an electrical structure of the center controller 200. The center controller 200 is provided therein with a control unit. As illustrated in FIG. 11, the control unit includes a motherboard 240, a gaming board 250, an actuator, or the like.

The gaming board 250 has the same structure as that of the gaming board 50. The motherboard 240 has the same structure as that of the motherboard 40.

The motherboard 240 includes a main CPU 241, a ROM 242, and a RAM 243.

The main CPU 241 serves as a time recorder 228 of FIG. 2, the JP game running unit 224, the shared display control unit 221, the JP game payout determining unit 227 and the center JP chance update control unit 230.

The ROM 242 stores a program run by the main CPU 241, and permanently-used data.

The RAM 243 stores data or a program used for the main CPU 241 to perform a process. For example, the RAM 243 has the JP game storage unit 223 of FIG. 2, the JP game screen storage unit 222, the center JP chance storage unit 225, and the progressive storage unit 226, in the form of data areas. In the data area of the JP game storage unit 223 is stored data related to a JP game. In the data area of the JP game screen storage unit 222 is stored display information which is based on the data related to the JP game. In the data area of the center JP chance storage unit 225 is stored the JP chance table of FIG. 9. In the data area of the progressive storage unit 226 is stored an accumulated total of the progressive value obtained from each of the gaming terminal 10.

Further, the center controller 200 includes a graphic board 268 and a drive motor 270 which serve as main actuators.

The graphic board 268 has the same structure as that of the graphic board 68, except in that the graphic board 268 controls image displaying of the shared display 203 based on a control signal from the main CPU 241.

The drive motor 270 is a stepping motor and is connected to a not-illustrated drive wheel. The drive motor 270 is driven by a control signal from the main CPU 241, and rotates the drive wheel to move the shared display 203.

Further, the center controller 200 includes a power unit 245 and a communication interface 244.

The power unit 245 serves as a power source for supplying power to the motherboard 240. The communication interface 244 communicates with the terminal controller 100 provided in each of the gaming terminals 10, through a communication line.

(Operation of Gaming Machine 1: Boot Process)

The following describes a boot process routine which takes place in the gaming machine 1. Upon powering on the gaming machine 1, a boot process starts in: the mother board 240 and gaming board 250 in the center controller 100, and in the motherboard 40 and the gaming board 50 in the terminal controller 100. The memory cards 53 and 263 are assumed to be inserted into the card slots 53S and 253S of the gaming boards 50 and 250, respectively. Further, the GALs 54 and 254 are assumed to be attached to the IC sockets 54S and 254S, respectively.

First, turning on the power switch of (powering on) the power units 45 and 245 boots the motherboards 40 and 240, and the gaming boards 50 and 260. Booting the motherboards 40 and 240 and the gaming boards 50 and 250 starts separate processes in parallel. Specifically, in the gaming board 50 and 250, the CPUs 51 and 251 read out preliminary authentication programs stored in the boot ROMs 52 and 252, respectively. Then, preliminary authentication is performed according to the read out programs so as to confirm and authenticate that no modification is made to authentication programs, before reading them in the motherboards 40 and 240, respectively (S1). Meanwhile, the main CPUs 41 and 241 of the motherboards 40 and 240 run BIOS stored in the ROMs 42 and 242 to load into the RAMs 43 and 243 compressed data built in the BIOS, respectively (S2). Then, the main CPUs 41 and 241 run a procedure of the BIOS according to the data loaded into the RAMs 43 and 243 so as to diagnose and initialize various peripheral devices (S3).

The main CPUs 41 and 241, which are respectively connected to the ROMs 55 and 255 of the gaming boards 50 and 250 via PCI buses, read out authentication programs stored in the ROMs 55 and 255 and stores them in the RAMs 43 and 243 (S4). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 253 inserted into the card slots 53S and 253S, and read out game programs and game system programs from the memory cards 53 and 253, respectively. In this case, the CPUs 41 and 241 each reads out four bytes of data constituting the game program and the game system program at one time. Next, with the authentication programs stored in the RAM 43 and 243, the CPUs 41 and 241 authenticate the game program and the game system program read out to confirm and prove that these programs are not modified (S5).

When the authentication properly ends, the main CPUs 41 and 241 write and store the authenticated game programs and game system programs in RAMs 43 and 243 (S6).

Next, the main CPUs 41 and 241 access, via the PCI buses, to the GALs 54 and 254 attached to the IC socket 54S 254S, and read out payout rate setting data from the GALs 54 and 254, respectively. The payout rate setting data read out is then written and stored in the RAMs 43 and 243 (S7).

Next, the main CPUs 41 and 241 read out, via the PCI buses, country identification information stored in the ROMs 55 and 255 of the gaming boards 50 and 255, respectively. The country identification information read out is then stored in the RAMs 43 and 243 (S8).

Figure 13:
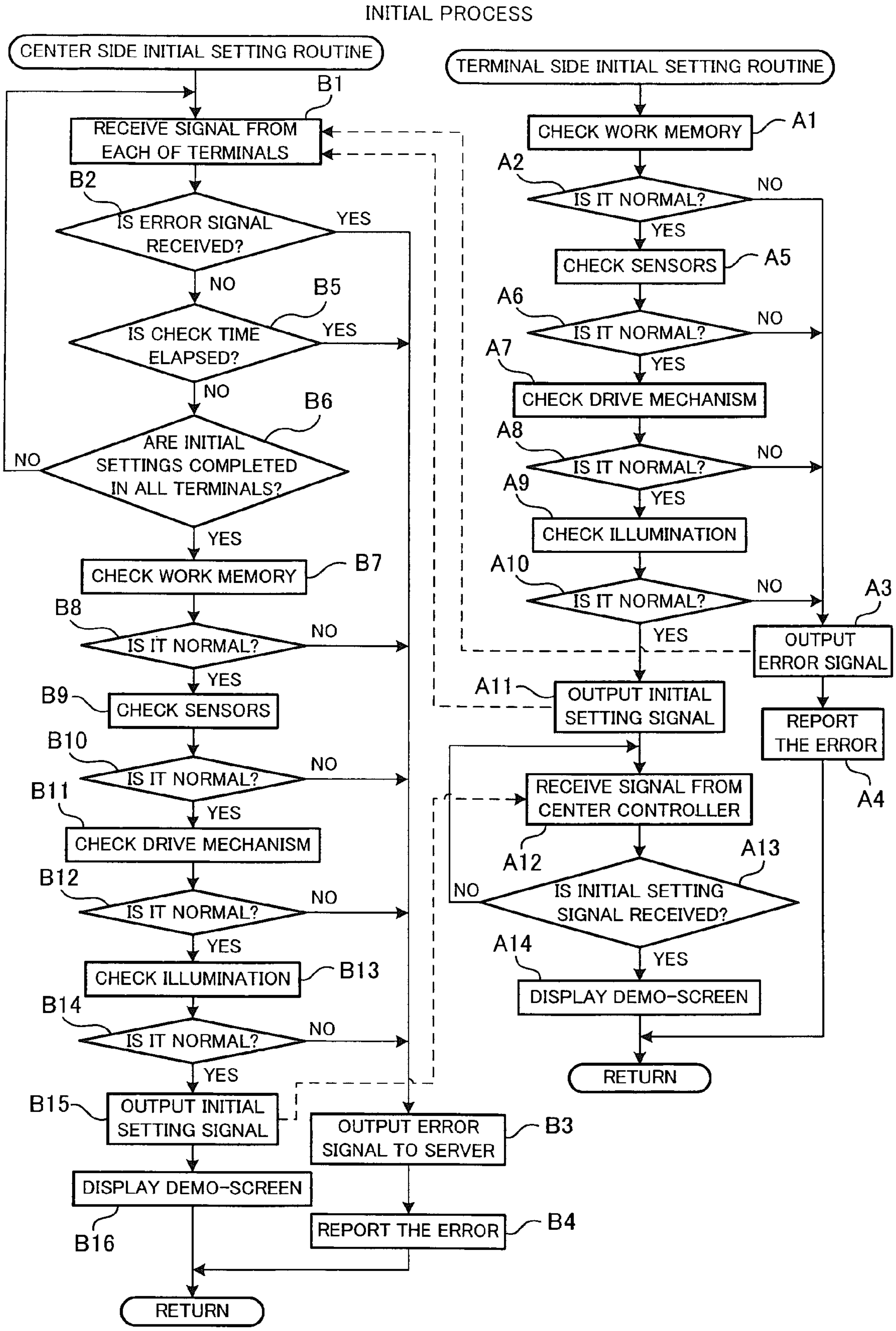
FIG. 13 is a flowchart illustrating an initial process that is executed by the gaming terminal and the center controller.

After this, the main CPU 41 and 241 each performs an initial process of FIG. 13.

(Operation of Gaming Machine 1: Initial Process)

Figure 12:
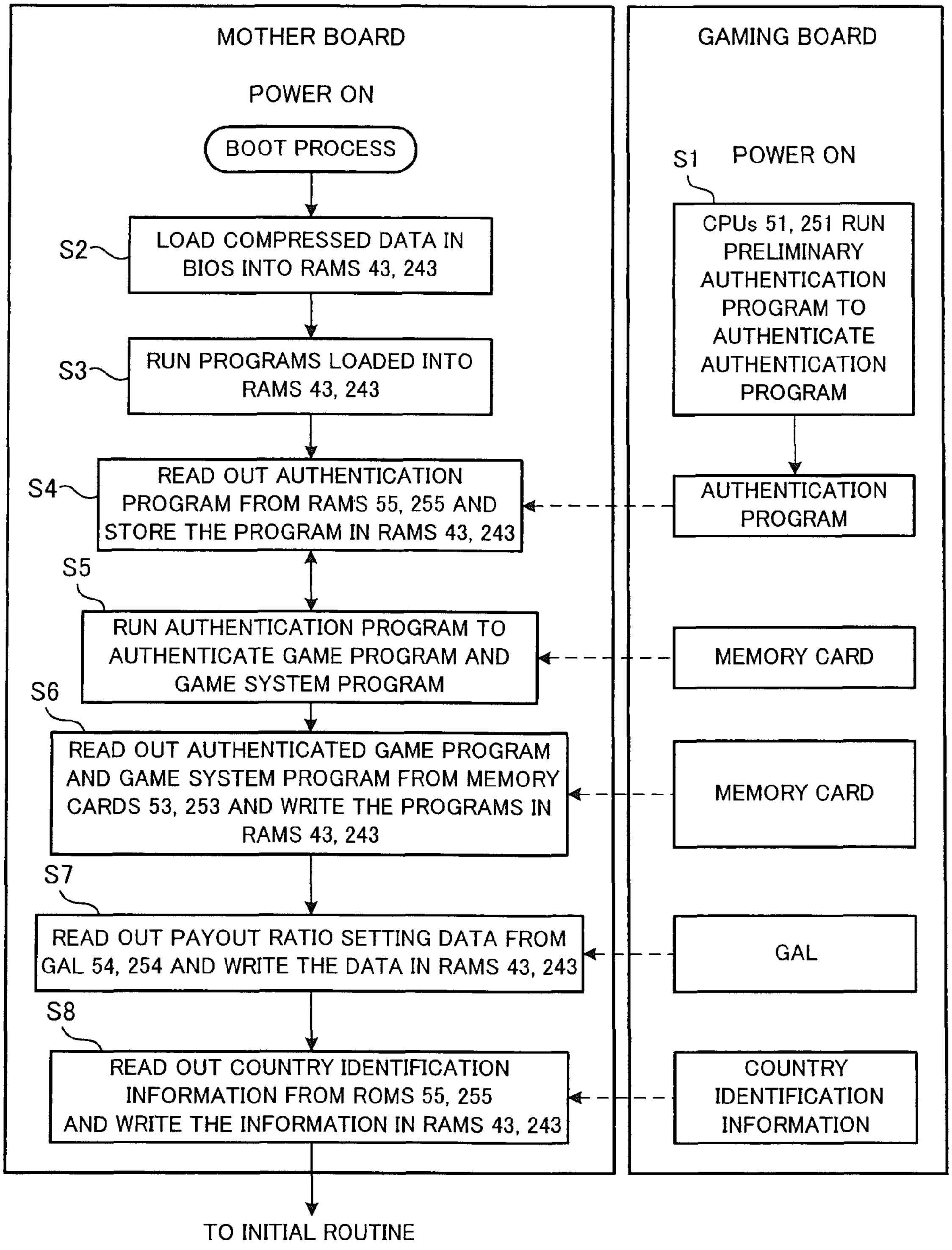
FIG. 12 is a flowchart illustrating a boot process that is executed by a gaming terminal and the center controller.

The following describes an initial process which takes place in the gaming machine 1. When the boot process of FIG. 12 is completed, the center controller 200 reads out from the RAM 243 a center side initial setting routine illustrated in FIG. 13 and executes the routine. Meanwhile, the gaming terminal 10 reads out from the RAM 43 a terminal side initial setting routine illustrated in FIG. 13 and executes the routine. The center side and terminal side initial setting routines are executed in parallel.

First, the main CPU 41 of the gaming terminal 10 checks operations of a work memory such as RAM 43 (A1). Then, the main CPU 41 determines if all the check results are normal (A2). If the main CPU 41 determines that the check results contains an error (A2: NO), the main CPU 41 outputs a signal notifying the error (hereinafter, error signal) to the center controller 100 (A3). Further, the main CPU 41 reports the error in the form of illuminating the lamp 30 or the like (A4), and then ends the routine.

On the other hand, if the main CPU 41 determines that the check results are all normal (A2: YES), the main CPU 41 checks operations of various sensors (A5). Then, the main CPU 41 determines if all the check results are normal (A6) If the main CPU 41 determines the check results contain an error (A6: NO), the main CPU 41 executes A3.

On the other hand in A6, if the main CPU 41 determines that the check results are all normal (A6: YES), the main CPU 41 checks operations of various drive mechanisms (A7). Then, the main CPU 41 determines if all the check results are normal (A8). If the main CPU 41 determines the check results contain an error (A8: NO), the main CPU 241 executes A3.

On the other hand in A8, if the main CPU 41 determines that the check results are all normal (A8: YES), the main CPU 41 checks operations of various illuminations (A9). Then, the main CPU 41 determines if all the check results are normal (A10). If the main CPU 41 determines the check results contain an error (A10: NO), the main CPU 41 executes A3.

After the checking operations through the steps A1 to A10 for checking operations of various functions, if the main CPU 41 determines the check results are all normal (A10: YES), the main CPU 41 outputs initial setting signal to the center controller 200 (A11). Then, an initial setting signal is waited from the center controller 200 (A12, A13: NO).

The main CPU 241 of the center controller 200 receives signals from each of the terminals 10 (B1). Then, the main CPU 241 determines whether a signal received is an error signal (B2). If the main CPU 241 determines that the signal is an error signal (B2: YES), the main CPU 241 outputs the error signal to a server of a not-illustrated host computer or the like (B3) to report the error (B4), and ends the routine.

On the other hand in B2, if the main CPU 241 determines that the signal is not an error signal (B2: NO), the main CPU 241 determines whether a predetermined time (check time) has elapsed from the time of powering on (B5). If the main CPU 241 determines that the check time has elapsed (B5: YES), B3 is executed. On the other hand, if the main CPU 241 determines that the check time has not yet elapsed (B5: NO), it is determined whether an initial setting signal is received from each of the gaming terminals 10 (B6). If the main CPU 241 determines that an initial setting signal from any one of the gaming terminals 10 is not received (B6: NO), the process returns to B1.

On the other hand, if the main CPU 241 determines that initial setting signals from all the gaming terminals 10 are received (B6: YES), the main CPU 241 checks operations of work memory such as the RAM 243 (B7). Then, the main CPU 241 determines whether all the check results are normal (B8). If the main CPU 241 determines the check results contain an error (B8: NO), the main CPU 241 executes B3.

On the other hand, if the main CPU 241 determines that the check results are all normal (B8: YES), the main CPU 241 checks operations of various sensors (B9). Then, the main CPU 241 determines whether all the check results are normal (B10). If the main CPU 241 determines the check results contain an error (B10: NO), the main CPU 241 executes B3.

On the other hand in B10, if the main CPU 241 determines that the check results are all normal (B10: YES), the main CPU 241 checks operations of various drive mechanisms (B11). Then, the main CPU 241 determines whether all the check results are normal (B12) If the main CPU 241 determines the check results contain an error (B12: NO), the main CPU 241 executes B3.

On the other hand in B12, if the main CPU 241 determines that the check results are all normal (B12: YES), the main CPU 241 checks operations of various illuminations (B13). Then, the main CPU 241 determines whether all the check results are normal (B14) If the main CPU 241 determines the check results contain an error (B14: NO), the main CPU 241 executes B3.

After the checking operations through the steps B7 to B14, if the main CPU 241 determines in B14 that all the check results are normal (B14: YES), the main CPU 241 outputs an initial setting signal to all the gaming terminals 10 (B15), and causes the shared display 203 to display a demo-screen (B16) Then, the main CPU 241 ends the routine.

In A12, the main CPU 41 of each of the gaming terminals 10 determines that an initial setting signal is received from the center controller 200 (A13: YES), and causes the terminal display 101 to display a demo-screen (A14). The main CPU 41 then ends the routine.

(Operation of Gaming Terminal 10: Game Running Process Routine)

Figure 14:
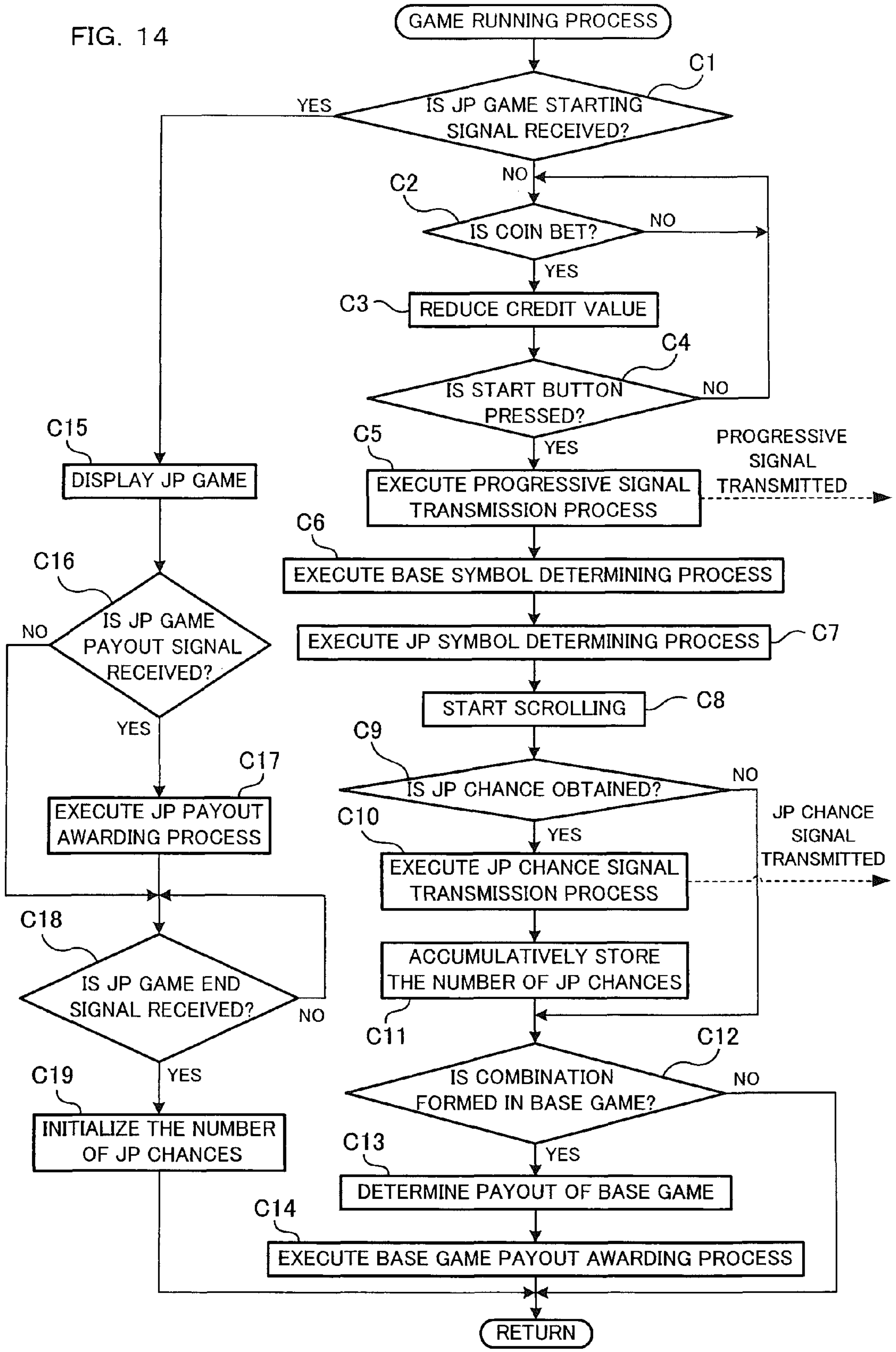
FIG. 14 is a flowchart illustrating a game running process routine that is executed in the gaming terminal.

After the terminal side initial setting routine of FIG. 13, the main CPU 41 of the gaming terminal 10 performs a game running process routine of FIG. 14. Through this game running process routine, a game is run.

As illustrated in FIG. 14, in the game running process routine, whether or not a JP game start signal is received from the center controller 200 is determined (C1). In C1, if it is determined that no JP game start signal is received (C1: NO), whether a coin is bet or not is determined (C2). In this step, it is determined whether a signal from the 1-BET switch 26S entered by pressing of the 1-BET button 26 is received. Meanwhile, it is determined whether a signal from the maximum BET switch 27S entered by pressing of the maximum BET button 27 is received. If no coin is BET (C2: NO), C2 is repeated until a coin is bet.

On the other hand, if a coin is bet (C2: YES), the credit value stored in the RAM 43 is reduced according to the number of coins bet (C3). When the number of coins bet surpasses the number of coins equivalent to the credit value stored in the RAM 43, C4 is repeated without the reduction of the credit value. When the number of coins bet exceeds the maximum number of coins bettable in one game (50 pieces in this embodiment), the process goes to a later-detailed step C4 without the reduction of the credit value.

Then, it is determined whether a spin button 23 is pressed or not (C4). If the spin button 23 is not pressed (C4: NO), the process returns to C2. Here, if the spin button 23 is not pressed (for example, the spin button 23 is not pressed but a command to end the game is input), the reduction of the credit value in C3 is canceled.

On the other hand, when the spin button 23 is pressed (C4: YES), a progressive transmission process is executed (C5) In other words, a progressive signal indicating a part of the game value bet is transmitted to the center controller 200.

Next executed is a base symbol determining process (C6) That is, the stop symbol determining program stored in the RAM 43 is run to determine base symbols 180 to be stopped in the matrix 156. Through the steps is determined a combination of base symbols 180 to be stopped in the matrix 156.

Next executed is a JP symbol determining process (C7) That is, the stop symbol determining program stored in the RAM 43 is run to determine base symbols 180J to be stopped in the matrix 156. Through the steps is determined a combination of JP symbols 180J to be stopped in the matrix 156.

Then, the scrolling process is executed to scroll base symbols 180 and JP symbols 180J at the same time, on the terminal display 101 (C8). The scrolling process is a process in which the base symbols 180 and the JP symbols 180J respectively determined in C6 and C7 are stopped (rearranged) in the matrix 156 after scrolling of symbols 180 and JP symbols 180J in an upward/downward direction.

Next, there is determined whether JP symbols 180J rearranged in the matrix 156 form a chance winning combination (C8). If a chance winning combination is not formed (C9: NO), there is determined whether base symbols 180 rearranged in the matrix 156 form a winning combination (C12).

On the other hand in C9, if it is determined that a chance winning combination is formed (C9: YES), a JP chance signal is transmitted to the center controller 200 (C10). After C10, the number of JP chances is added to the number of JP chances in RAM 43 (C11). In this step, the accumulated total of the JP chances is displayed in the JP chance display area 160 of the terminal display 101.

Next, if it is determined that a winning combination is formed (C12: YES), a payout according to the winning combination formed is determined (C13). After the payout is determined, a pay out process is executed (C14). On the other hand in C12, if it is determined that no winning combination is formed (C12: NO), this routine is ended.

If a JP game start signal is received from the center controller 200 (C1: YES), a JP game is displayed on the terminal display 101 (C15).

After the terminal display 101 displays thereon the JP game in C15, there is determined whether a JP game payout signal is received from the center controller 200 (C16). If it is determined that no JP game payout signal is received (C16: NO), there is determined whether a JP game end signal is received from the center controller 200 (C18).

On the other hand, if it is determined that a JP game payout signal is received from the center controller 200 (C16: YES), a payout based on the JP game payout signal is awarded (C17). C18 is executed thereafter.

If it is determined that no JP game end signal is received (C18: NO), a JP game end signal is waited (C18).

On the other hand, if it is determined that a JP game end signal is received from the center controller 200 (C18: YES), the number of JP chances stored in the RAN 43 is set to an initial value (C19). In this step, the number of JP chances displayed on the JP chance display area of the terminal display 101 is also set to the initial value. This routine ends thereafter.

Through the game running process routine, the gaming terminal 10 runs a base game, and at the same time, runs a chance game offering a chance of winning a JP chance which qualifies a player to join a JP game offering a chance of winning a higher payout than the base game. Then, the player is awarded a payout according the result of the base game, and is given zero or more chance flags according to the result of the chance game. Further, the number of JP chances awarded is accumulatively stored in the RAM 43 of the gaming terminal 10. When this number equals or surpasses a predetermined number, the JP game is run. According to the result of the JP game is awarded a payout. This structure allows a player to play the chance game while he/she plays the base game, and allows the player to obtain zero or more JP chances which are given according to a result of the chance game. Accordingly, the player is able to know the result of the chance game while enjoying the base game. This realizes a higher level of gaming characteristic than a gaming machine which independently runs a chance game inside the gaming terminal 10 where a player is not able to see.

Further, as in the game running process routine, the number of JP chances stored in the RAM 43 is displayed on the terminal display 101 while the player is playing the base game. This may allow the player to play the base game while letting him/her know the number of JP chances. Thus, the above structure may motivate the player to continuously play games for a longer period of time.

(Operation of Terminal Controller 100: Self Reset Process Routine)

Figure 15:
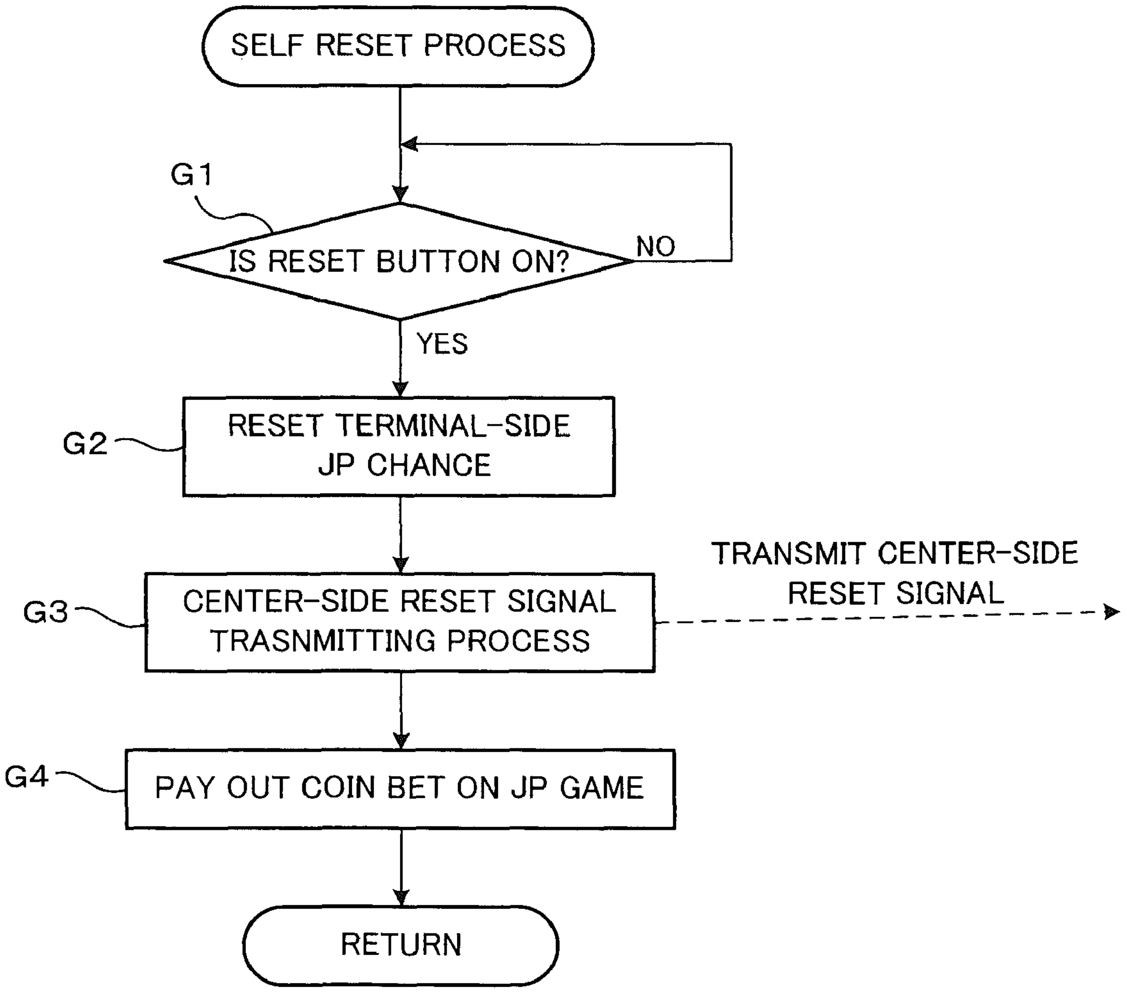
FIG. 15 is a flowchart illustrating a self reset process routine that is executed in the gaming terminal.

FIG. 15 shows a self reset process routine that is executed in the terminal controller 100. When a self reset process routine is executed, the terminal controller 100 determines whether a player has pressed the reset button 310 (G1). When it is determined that the reset button has not been pressed (G1: NO), the terminal controller waits until a player presses the reset button. On the other hand, when it is determined that the reset button has been pressed (G1: YES), the terminal controller initializes the number of JP chances stored in the RAM 43 (G2). At this time, the terminal controller transmits a center-side reset signal to the center controller 200 (G3). Then, the terminal controller pays out the coins bet on a JP game (G4). This routine ends thereafter.

Like the self reset process routine, when a player presses the reset button 310, the number of JP chances can be initialized. Hence, the player can initialize the number of JP chances, based on his/her determination.

(Operation of Terminal Controller 100: Terminal-Side JP Chance Succeeding Process Routine)

Figure 16:
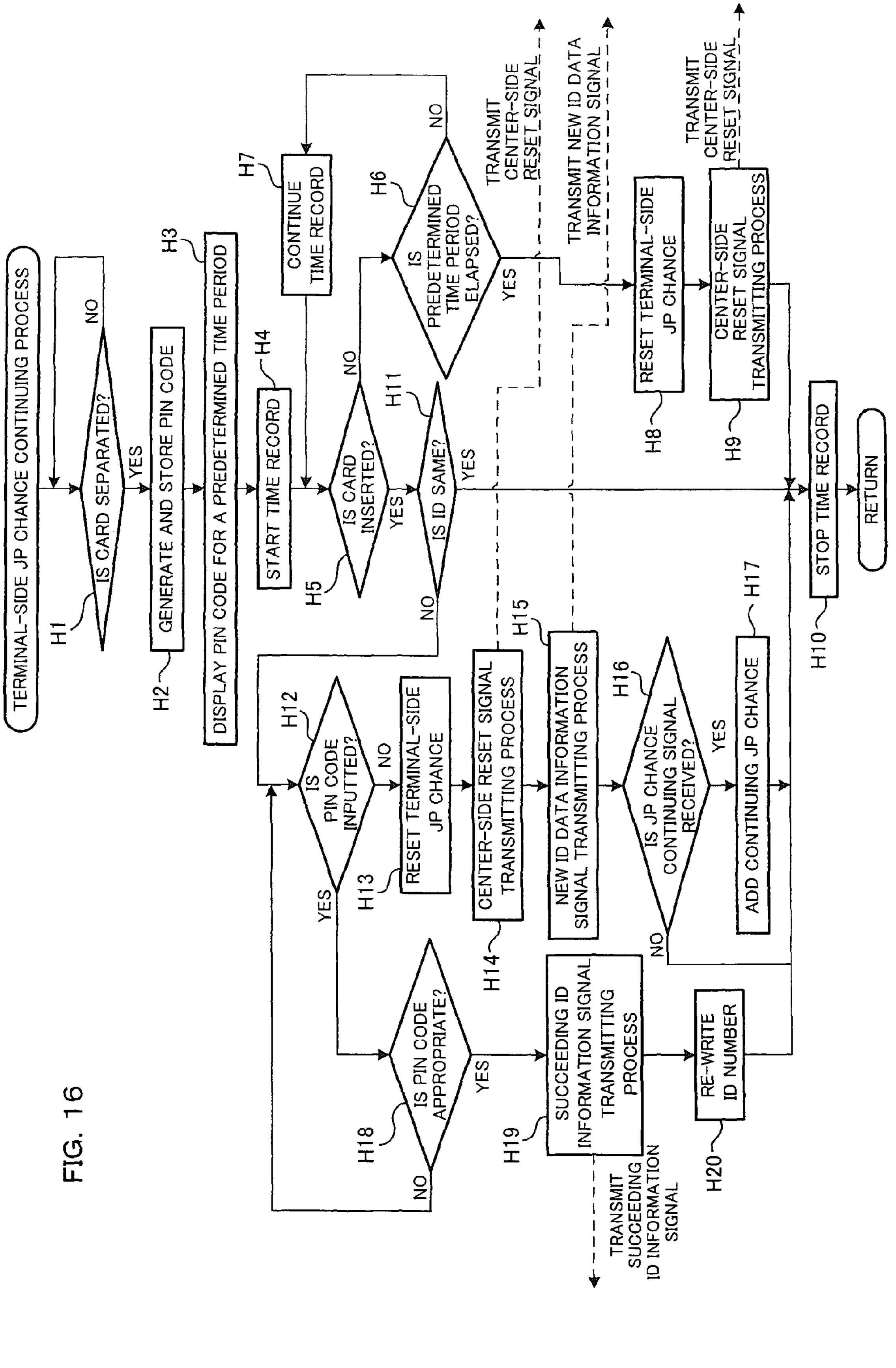
FIG. 16 is a flowchart illustrating a terminal-side JP chance succeeding process routine that is executed in the gaming terminal.

FIG. 16 shows a terminal-side JP chance succeeding process routine that is executed by the terminal controller 100. When a terminal-side JP chance succeeding process routine is executed, the terminal controller 100 determines whether the ID card 300 has been removed from the card reader 36 (H1). When it is determined that the ID card has not been removed (H1: NO), the terminal controller waits until the ID card 300 is removed (H1). On the other hand, when it is determined that the ID card 300 has been removed (H1: YES), the terminal controller generates a PIN code and stores it in the RAM 43 in association with the PIN code with the number of JP chances and the ID data (H2). Afterwards, the terminal controller displays the generated PIN code on the upper image display panel 33 for a predetermined period of time (H3) and causes the count unit 123 to start measuring time (H4).

Then, the terminal controller 100 determines whether the ID card 300 has been inserted from the card reader 36 (H5). When it is determined that the ID card has not been inserted (H5: NO), the terminal controller 100 determines whether a predetermined period of time has elapsed since the count unit 123 has started measuring time (H6). When it is determined that a predetermined period of time has not elapsed since the count unit 123 began measuring time (H6: NO), the time recording is continued (H7) and the process returns to H5. On the other hand, when it is determined in H6 that a predetermined period of time has elapsed since the count unit 123 began measuring time (H6: YES), the terminal controller initializes the number of JP chances stored in the RAM 43 (H8). In addition, the terminal controller 100 transmits a center-side reset signal to the center controller 200 (H9). Then, the terminal controller 100 causes the count unit 123 to stop measuring time (H10) and ends this routine.

On the other hand, when it is determined in H5 that the ID card 300 has been inserted from the card reader 36 (H5: YES), the terminal controller 100 determines whether the ID data stored in the inserted ID card 300 is identical or not (H11). When it is determined that the ID data is identical (H11: YES), the terminal controller 100 causes the count unit 123 to stop measuring time (H10) and ends this routine.

On the other hand, when it is determined in H11 that the ID data is not identical (H11: NO), the terminal controller 100 determines whether a PIN code is inputted by a player (H12). When it is determined that a PIN code is not inputted (H12: NO), the terminal controller 100 initializes the number of JP chances stored in the RAM 43 (H13). In addition, the terminal controller 100 transmits a center-side reset signal to the center controller 200 (H14). Afterwards, the terminal controller 100 transmits to the center controller 200 a new ID data information signal including the newly inputted ID data stored in the ID card 300 inserted from the card reader 36 (H12).

Then, the terminal controller 100 determines whether a JP chance continuing signal is received from the center controller 200 (H16). When it is determined that the signal is not received (H16: NO), the terminal controller 100 causes the count unit 123 to stop measuring time (H10) and ends this routine.

On the other hand, when it is determined in H16 that a JP chance continuing signal is received (H16: YES), the terminal controller adds and stores the continuing JP chance into the RAM 43 (H17). Afterwards, the terminal controller 100 causes the count unit 123 to stop measuring time (H10) and ends this routine.

On the other hand, when it is determined in H12 that a PIN code is not inputted (H12: YES), the terminal controller determines whether the inputted PIN code is correct or not (H18) When it is determined that the inputted PIN code is not correct (H18: NO), the terminal controller waits until a PIN code is again inputted in H12. On the other hand, when it is determined in H18 that the inputted PIN code is correct (H18: YES), the terminal controller transmits a succeeding ID information signal to the center controller (H19). Afterwards, the terminal controller re-writes the original ID number stored in the RAM 43 to the ID number newly inputted (H20). Then, the terminal controller causes the count unit 123 to stop measuring time (H10) and ends this routine.

Like the terminal-side JP chance succeeding process routine, it is determined whether the ID data newly inputted from the card reader 35 is correct or not. When it is determined that the newly inputted ID data is not correct, it is determined whether the PIN code inputted from the keypad 38 is correct or not. When it is determined that the PIN code inputted from the keypad 38 is not correct, the terminal controller initializes the number of JP chances stored in the RAM 43, in association with the original ID data. When it is determined that the PIN code is correct, the terminal controller 100 stores the newly inputted ID data in the RAN 43, replacing the original ID data. Hence, when another player other than the player who has obtained one or more JP chances intends to play a game, it is possible to restrain the another player from using the one or more JP chances obtained by the previous player and to enable only a player who correctly inputs the PIN code to continuously use the JP chances obtained by the previous player.

(Operation of Terminal Controller 100: Terminal-Side JP Chance Reset Process Routine)

Figure 17:
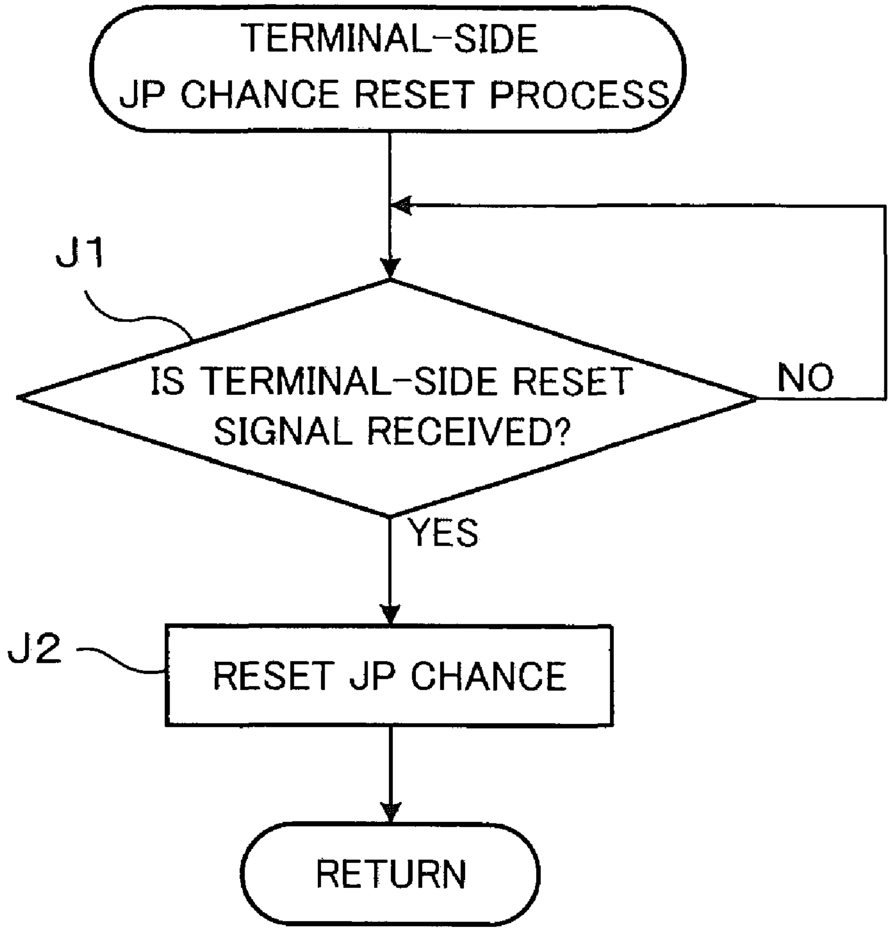
FIG. 17 is a flowchart illustrating a terminal-side JP chance reset process routine that is executed in the gaming terminal.

FIG. 17 shows a terminal-side JP chance reset process routine that is executed in the terminal controller 100. The terminal-side JP chance reset process routine is transmitted to the movement source gaming terminal 10 when a player moves to another gaming terminal 10. When the terminal-side JP chance reset process routine is executed, the terminal controller 100 determines whether a terminal-side reset signal is received from the center controller 200 (J1). When it is determined that the signal is not received (J1: NO), the terminal controller waits until a terminal-side reset signal is received (J1). On the other hand, when it is determined that a terminal-side reset signal is received (J1: YES), the terminal controller initializes the number of JP chances stored in the RAM 43 (J2). This routine ends thereafter.

(Operation of Center Controller 200: Progressive Addition Process Routine)

Figure 18:
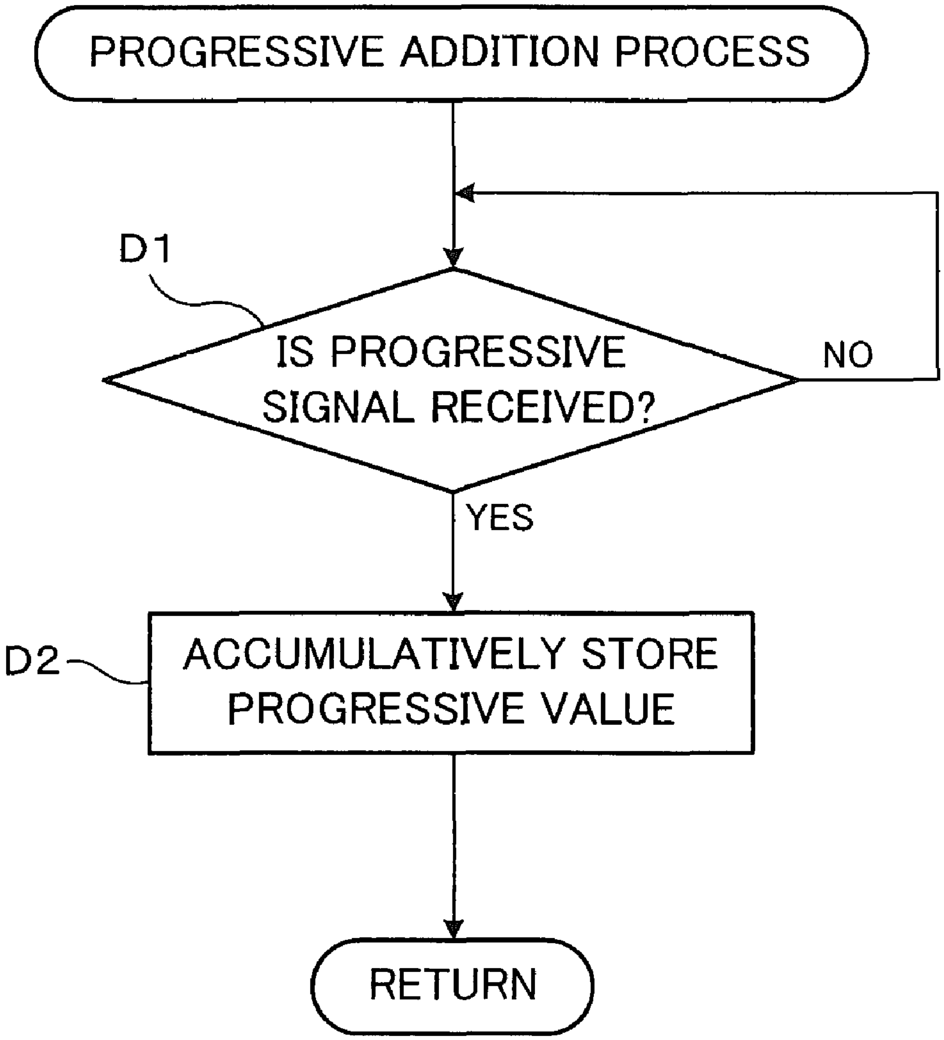
FIG. 18 is a flowchart illustrating a progressive addition process routine that is executed in the center controller

FIG. 18 shows a progressive addition process routine that is executed by the center controller 200. When the progressive addition process is executed, the center controller 200 determines whether a progressive signal from a terminal controller 100 of a gaming terminal 10 is received (D1). If the center controller 200 determines that no progressive signal is received (D1: NO), the center controller 200 waits for a progressive signal (D1).

On the other hand, if the center controller 200 determines that a progressive signal is received from a terminal controller 100 (D1: YES), the center controller 200 accumulatively stores a progressive value indicated by the progressive signal in the RAM 243 (D2). This routine ends thereafter.

(Operation of Center Controller 200: JP Chance Addition Process Routine)

Figure 19:
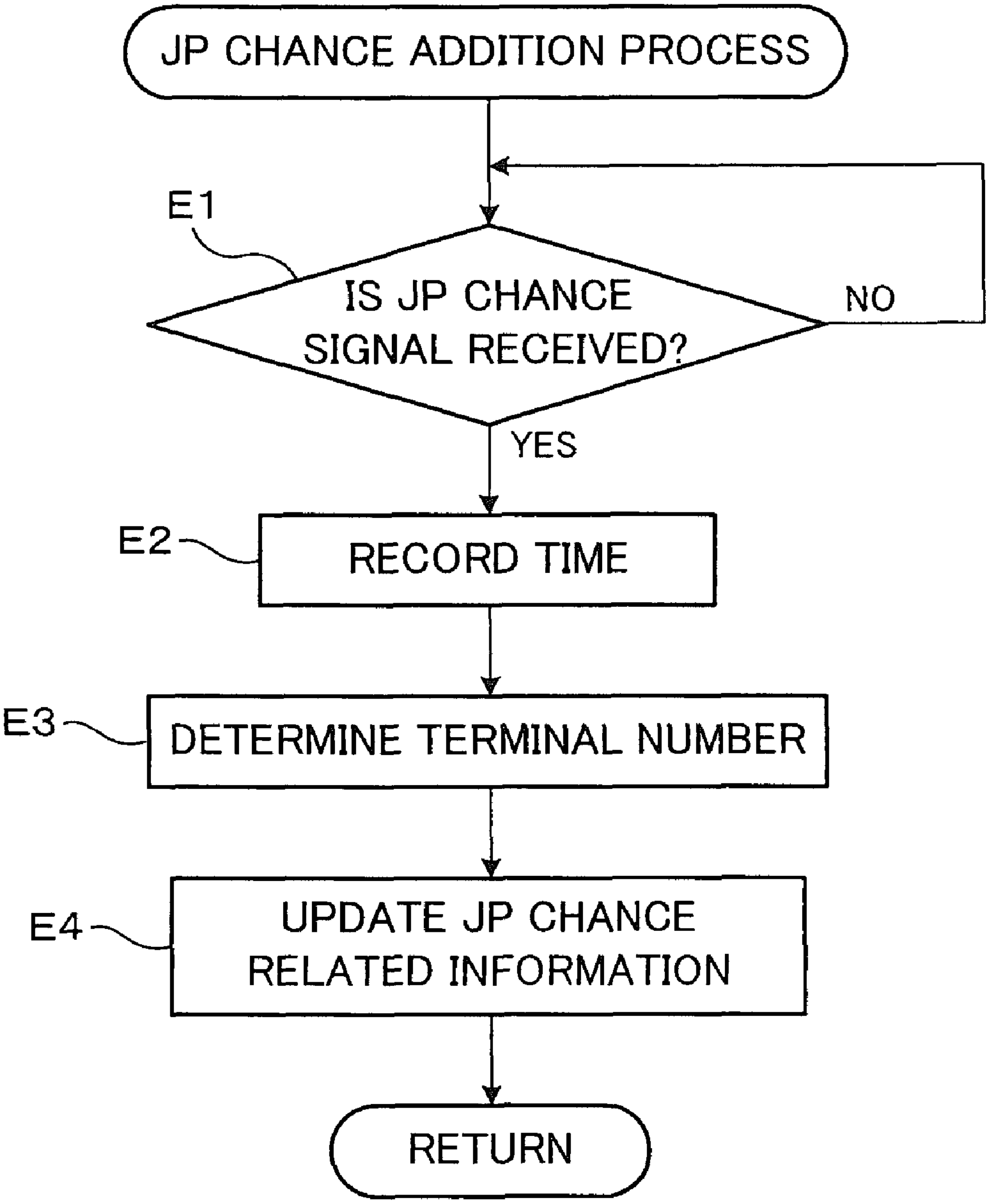
FIG. 19 is a flowchart illustrating a JP chance addition process routine that is executed in the center controller

FIG. 19 shows a JP chance addition process routine that is executed by the center controller 200. When the JP chance addition process routine is executed, the center controller 200 determines whether a JP chance signal is received from the terminal controller 100 of a gaming terminal 10 (E1). If the center controller 200 determines that no JP chance signal is received (E1: NO), the center controller waits for the JP chance signal (E1).

On the other hand, if the center controller 200 determines that a JP chance signal is received from the terminal controller 100 (E1: YES), the center controller records the time of obtaining the JP chance (E2).

After E2, the center controller 200 determines, based on the JP chance signal, the terminal number given to the gaming terminal 10 having transmitted the JP chance signal received (E3). Then, a set of data containing "time" recorded in E2, "terminal number" determined in E3, and "the number of JP chances" indicated by the JP chance signal is stored with being associated with the ID data in the RAM 243 and are updated (E4) This routine ends thereafter.

(Operation of Center Controller 200: JP Game Running Process Routine)

Figure 20:
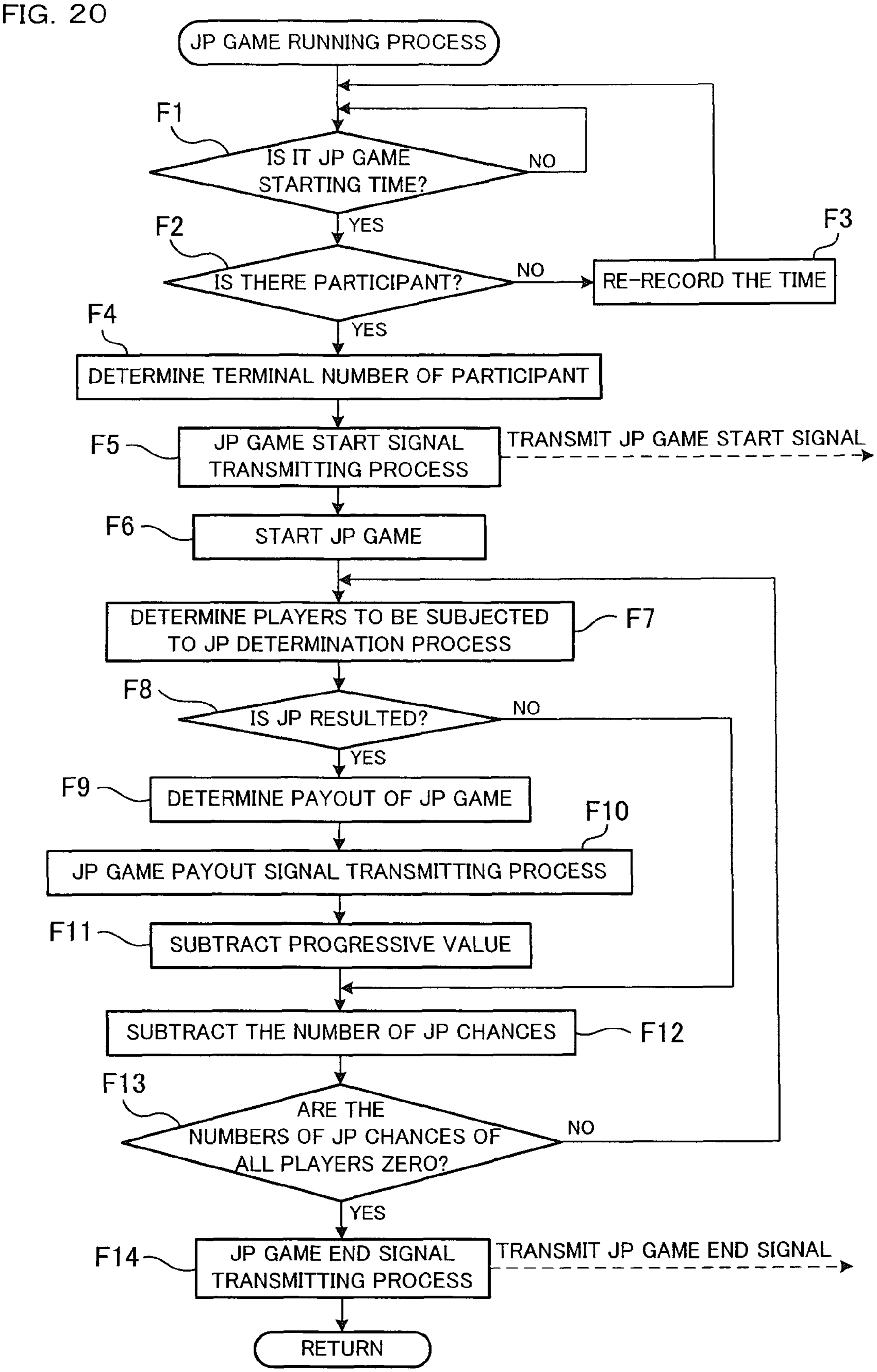
FIG. 20 is a flowchart illustrating a JP game running process routine that is executed in the center controller.

FIG. 20 shows a JP game running process routine that is executed by the center controller 200. When the JP game running process routine is executed, the center controller 200 determines whether a JP game starting time has come (F1). If the center controller 200 determines the JP game starting time has not come, the JP game starting time is waited (F1).

On the other hand in F1, if the center controller 200 determines the JP game starting time has come (F1: YES), the center controller 200 determines if there is a gaming terminal 10 to participate in the JP game, by referring to the JP chance data table stored in RAM 243 (F2). If the center controller 200 determines that there is no gaming terminal 10 to participate in the JP game (F2: NO), the center controller 200 waits for the next JP game starting time (F3). The process then returns to F1.

On the other hand in F2, if there is a gaming terminal 10 to participate in the JP game (F2: YES), the center controller 200 determines the terminal number of the gaming terminal 10 (F4). Then, a JP game start signal is transmitted to the terminal controller 100 provided in the gaming terminal 10 whose terminal number has been determined in F4 (F5). This transmission of the JP game start signal in F5 triggers the JP game to start (F6).

When the JP game starts in F6, there is determined a gaming terminal 10 to be subjected to a process of determining whether or not a jackpot is awarded. (F7). The order of subjecting gaming terminals 10 to the process of determining is determined by referring to the JP chance data table in the RAM 243 so that the JP chances having obtained are sequentially consumed in order of time of obtaining the JP chances. Then, a process of determining whether or not a jackpot is awarded is performed with respect to a gaming terminal 10 with the terminal number determined in F7 (F8). If it is determined that a jackpot will not be awarded (F8: NO), the number of JP chances obtained by the gaming terminal 10 with the determined terminal number, which number is stored in the RAM 243, is reduced by "1" (F12).

On the other hand, if it is determined that a jackpot will be awarded (F8: YES), an amount of the payout of the JP game is determined (F9). After F9, a JP game payout signal is transmitted to the terminal controller 100 of the gaming terminal with the determined terminal number (F10). Next, a progressive value corresponding to the amount of the payout determined in F9 is subtracted from the accumulated progressive value in the RAM 243 (F11). After F11 is played F12.

After F12, there is determined whether JP chances of all the gaming terminals 10 stored in the RAM 243 are consumed (F13). If it is determined that there is a JP chance yet to be consumed (F13: NO), the process returns to F7.

On the other hand, if it is determined in F13 that all JP chances are consumed (F13: YES), a JP game end signal is transmitted to the terminal controller 100 of the gaming terminal 10 to which a JP game start signal have been transmitted (F14). This routine ends thereafter.

Through the JP game running process routine, the JP game is run only for a gaming terminal 10 having at least a predetermined number of JP chances. Thus, a player who has won a predetermined number or more of JP chances is able to play the JP game, and another player who has not earned the predetermined number of JP chances is able to continue the base game. This may be advantageous in that the other player is able to enjoy continuing the base game without his/her pace being interrupted. Further, for each of the gaming terminals 10, the center controller 200 records a time of obtaining a JP chance, associates the time of obtaining the JP chance with the number of the JP chances, and accumulatively stores the time and number in RAM 243. Further, the center controller 200 determines a payout of the JP game, sequentially consuming JP chances in order of the time associated therewith Thus, a payout is determined for a player who obtained one or more JP chances earlier than another. By determining payouts for players in such a manner that a player who is entitled to a payout awarding earlier than another receives a higher payout, it may be possible to keep the enthusiasm of players to obtain JP chances earlier than the others.

(Operation of Center Controller 200: JP Game Running Process Routine)

Figure 21:
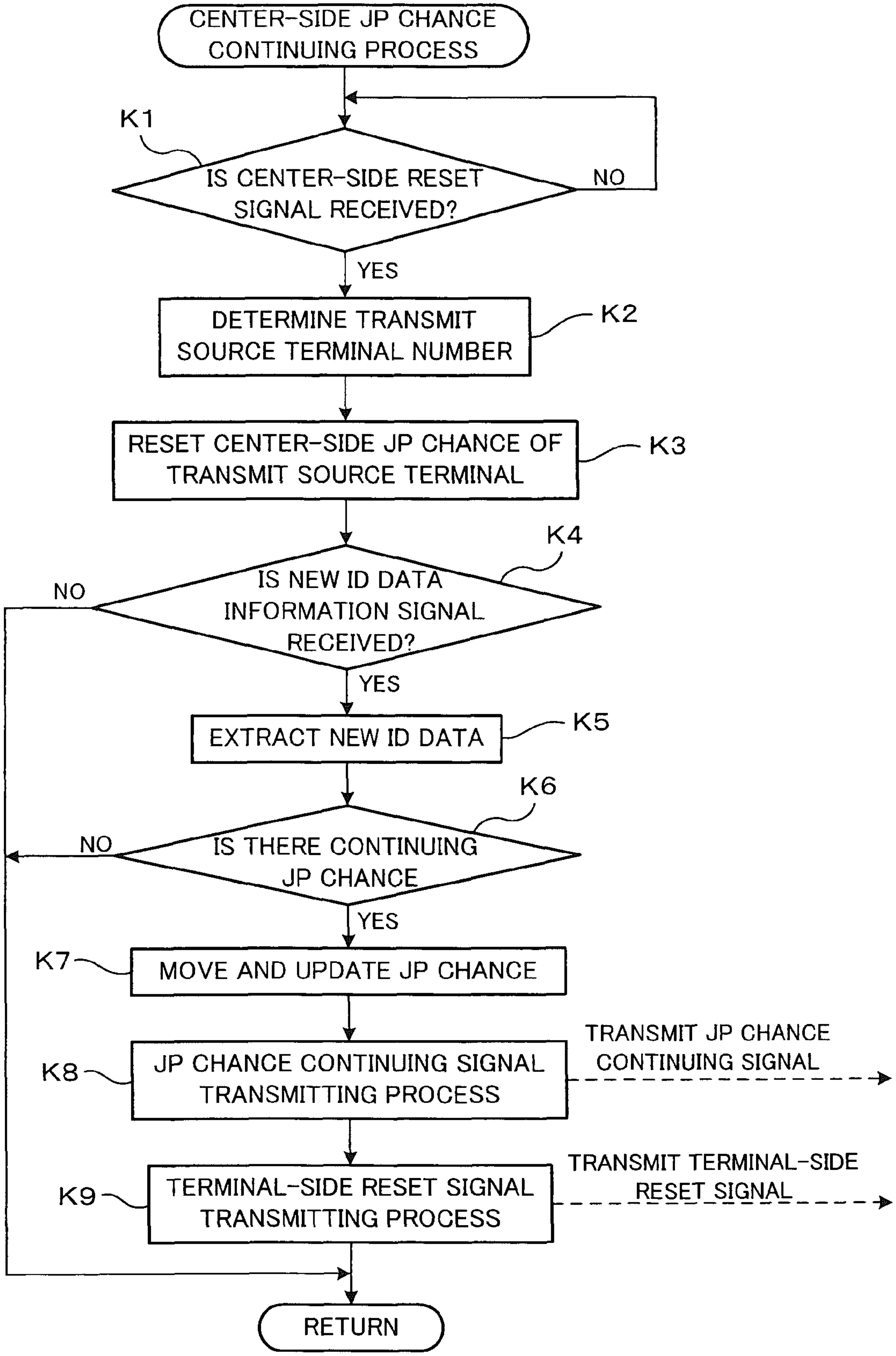
FIG. 21 is a flowchart illustrating a center-side JP chance continuing process routine that is executed in the center controller

FIG. 21 shows a center-side JP game continuing process routine that is executed by the center controller 200. When the center-side JP game continuing process routine is executed, the center controller 200 determines whether a center-side reset signal is received from the terminal controller 100 (K1). When it is determined that the signal is not received (K1: NO), the center controller waits until a center-side reset signal is received (K1). On the other hand, when it is determined that a center-side reset signal is received (K1: YES), the center controller 200 determines the terminal number of the transmit source gaming terminal 10, based on the center-side reset signal (K2). Afterwards, the center controller 200 initializes the number of JP chances stored in the RAM 243 (K3).

Then, the center controller 100 determines whether a new ID information signal is received from the terminal controller 100 (K4). When it is determined that the signal is not received (K4: NO), this process routine ends.

On the other hand, when it is determined in K4 that a new ID information signal is received from the terminal controller 100 (K4: YES), the center controller 100 extracts the newly inputted ID data, based on the new ID information signal (K5). Afterwards, the center controller determined whether there is a continuing JP chance associated with the newly inputted ID data, referring to the JP chance data table of FIG. 9 stored in the RAM 243 (K6). When it is determined that there is no continuing JP chance (K6: NO), this routine ends.

On the other hand, when it is determined in K6 that a continuing JP chance is in the gaming terminal 10 (i.e., first gaming terminal 10) other than the sender gaming terminal (i.e. second gaming terminal 10) (K6: YES), the center controller moves the JP chance to the second gaming terminal 10 from the first gaming terminal 10, in the JP chance data table of FIG. 9 stored in the RAM 243 (K7). Afterwards, the center controller transmits a JP chance continuing signal to the terminal controller 100 of the second gaming terminal 10 (K8). Further, the center controller transmits a terminal-side reset signal to the terminal controller 100 of the movement source gaming terminal 10 (K9). This routine ends thereafter.

(Operation of Center Controller 200: Center-Side JP Chance Succeeding Process Routine)

Figure 22:
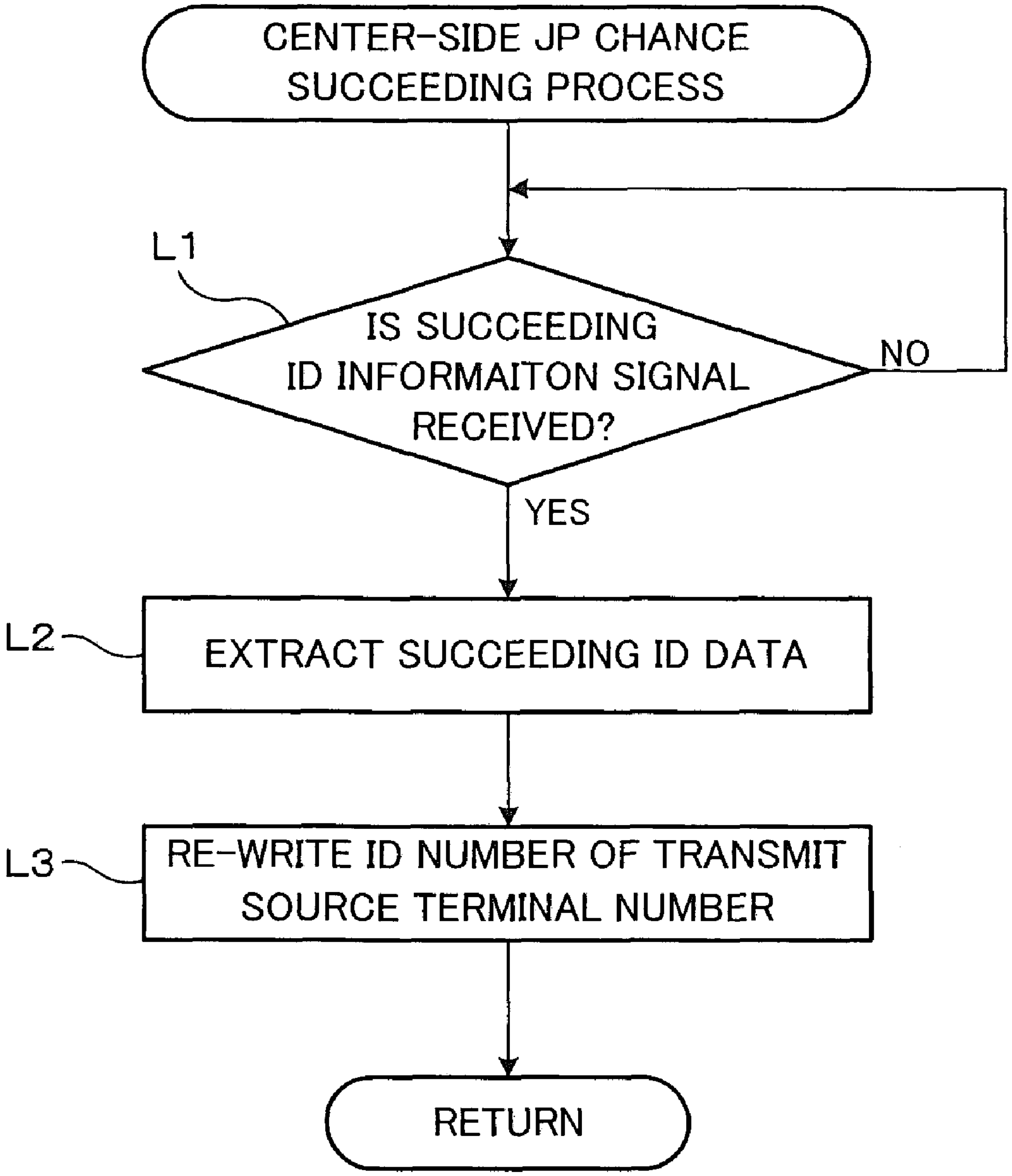
FIG. 22 is a flowchart illustrating a center-side JP chance succeeding process routine that is executed in the center controller.

FIG. 22 shows a center-side JP chance succeeding process routine that is executed by the center controller 200. When the center-side JP chance succeeding process routine is executed, the center controller 200 determines whether a succeeding ID information signal is received from the terminal controller 100 of a gaming terminal 10 (L1). When it is determined that a succeeding ID information signal is not received (L1: NO), the center controller waits until a succeeding ID information signal is received (L1).

On the other hand, when it is determined that a succeeding ID information signal is received (L1: YES), the center controller extracts the succeeding ID data, i.e., the newly inputted ID data, based on the succeeding ID information signal (L2). Afterwards, the center controller stores the newly inputted ID data in the JP chance data table of FIG. 9 stored in the RAM 243, replacing the original ID data (L3).

Like the terminal-side JP chance continuing process routine of FIG. 16, the terminal-side JP chance reset process routine of FIG. 17, the center-side JP chance continuing process routine of FIG. 21, and the center-side JP chance succeeding process routine of FIG. 22, when ID data specifying a player is newly inputted from the card reader 36, it is determined whether the newly inputted ID data is correct or not. When it is determined that the newly inputted ID data is not correct and that the PIN code inputted from the keypad 38 is not correct, the number of JP chances stored in the RAM 43, in association with the original ID data is initialized. Hence, when another player other than the player who has obtained one or more JP chances intends to play a game, it is possible to restrain the another player from using the JP chances obtained by the previous player. On the other hand, when it is determined that the PIN code inputted from the keypad 38 is appropriate, the newly inputted ID data is stored in the original ID data stored in the RAM 43 of the gaming terminal 10. Thus, it is possible to enable only a player who correctly inputs the PIN code to continuously use the JP chances obtained by the previous player.

Further, when the ID card 300 is not inserted into the card reader 36 of any one gaming terminal 10 in a predetermined period of time since the ID card 300 is removed, the number of JP chances obtained is initialized. Hence, even when a player quits a game without consuming the one or more JP chances s/he has obtained, it is possible to restrain another player from using the one or more JP chances. Moreover, when the number of JP chances associated with the ID data newly inputted from the card reader 36 is stored in the RAM 243 of the center controller 200, it can be added to the JP chances of the gaming terminal whose number of JP chances is initialized. Thus, since it is possible to enable even a player who has moved to another gaming terminal 10 to continuously use the JP chances obtained, the degree of freedom to select a gaming terminal 10 is increased.

Note that the present embodiment deals with a case where the JP game is run for a gaming terminal 10 having one JP chance; however, the present invention is not limited to this. For example, the JP game may be run for a gaming terminal 10 having three JP chances.

Further, the present embodiment deals with a case where one JP chance is awarded for a chance winning when three JP symbols 180J are arranged in the matrix 156; however, the present invention is not limited to this. For example, two JP chances may be awarded when three JP symbols 180J are arranged in the matrix 156.

Further, the present embodiment deals with a case where the number of JP chances obtained by a gaming terminal 10 is displayed on the terminal display of the gaming terminal 10; however, the present invention is not limited to this. For example, it is possible to collectively display the numbers of obtained JP chances of all the gaming terminals 10 on the shared display 203.

Further, in the present embodiment, the ID data is inputted into the gaming terminal 10 using the ID card 300. However, the present invention is not limited thereto. Like the PIN code, for example, ID data may be inputted when a player manually performs an input operation using a keypad 38.

A PIN code is a four-digit number in the present embodiment; however, the present invention is not limited thereto. For example, alphabets, symbols or the like may be used. In addition, the keypad 38 may be capable of inputting therethrough not only numbers, but also alphabets, symbols, or the like.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer or computer network. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes performed in the steps or blocks, these processes are essentially executed by various devices. Further, the other structures necessary for the steps or blocks are obvious from the above descriptions.

What is claimed is:

1. A gaming terminal, comprising:

a base game offering a chance of winning a payout according to a predetermined combination;

a chance game which is independently run at the same time as the base game, the chance game offering a chance of obtaining a chance flag which qualifies a player to join a special game offering a chance of winning a higher payout than the base game;

an ID data input device into which ID data specifying a player is inputted;

a PIN code associated with the ID data and a number of chance flags;

a terminal storage unit that stores therein the number of chance flags in association with the ID data inputted into the ID data input device, and the PIN code;

a PIN code input device through which the PIN code is inputted;

a terminal display which displays images of the base game, the chance game, and the special game; and a terminal controller which performs the steps of:

(a1) when the ID data is inputted into the ID data input device, storing the ID data in the terminal storage unit;

(a2) running the base game and the chance game at the same time;

(a3) determining and awarding a payout according to a result of the base game;

(a4) determining and awarding the number of chance flags according to a result of the chance game;

(a5) accumulatively storing, in the terminal storage unit, the number of chance flags awarded, in association with the ID data and the PIN code;

(a6) running the special game when the number of the chance flags stored in the terminal storage unit equals or surpasses a predetermined number and awarding a payout determined according to a result of the special game;

(a7) when the ID data is newly inputted into the ID data input device, determining whether the newly inputted ID data is correct or not, referring to an original ID data stored in the terminal storage unit;

(a8) when it is determined that the newly inputted ID data is not correct, determining whether the PIN code inputted through the PIN code input device is correct or not, referring to the PIN code stored in the terminal storage unit; and (a9) when it is determined that the PIN code inputted through the PIN code input device is not correct, initializing the number of chance flags associated with the original ID data stored in the terminal storage unit, and when it is determined that the PIN code inputted from the PIN code input device is correct, storing the newly inputted ID data, replacing the original ID data stored in the terminal storage unit.

2. The gaming terminal according to claim 1, wherein the ID data input device detects that a storage medium storing the ID data is inserted or removed, and reads out and receives the ID data when the storage medium is inserted.

3. The gaming terminal according to claim 1, further comprising:

a PIN code generation unit that generates the PIN code, wherein the ID data input device detects that a storage medium storing the ID data is inserted or removed, and reads out and receives the ID data when the storage medium is inserted, and wherein the terminal controller generates the PIN code by the PIN code generation unit and stores the generated PIN code in the terminal storage unit, when the storage medium is separated.

4. A gaming device, comprising:

a plurality of gaming terminals a special game offering a chance of winning a higher payout than a base game offering a chance of winning a payout according to a predetermined combination;

a center storage unit storing a number of chance flags stored in a terminal storage unit of each of the gaming terminals and ID data that specifies a player, each of the chance flags being obtained from a chance game which is independently run at the same time as the base dame and qualifying a player to join the special game, and the ID data inputted from an ID data input device of each of the gaming terminals;

a shared display which displays an image of the special game;

a center controller which performs the steps of:

(b1) obtaining the number of chance flags and the ID data from each of the gaming terminals;

(b2) storing the number of chance flags obtained, in the center storage unit of each of the gaming terminals, in association with the ID data;

(b3) running the special game at a predetermined timing, when the number of chance flags stored in the center storage unit equals or surpasses a predetermined number;

(b4) determining a payout according to a result of the special game;

(b5) when it is determined that ID data newly inputted into the ID data input device of each of the gaming terminals is not correct and that a PIN code is not correct, initializing the number of chance flags associated with an original ID data stored in the center storage unit, the PIN code being inputted from a PIN code input device of each of the gaming terminals and associated with the ID data, and the number of chance flags;

(b6) when it is determined that the newly inputted ID data is not correct and that the PIN code inputted through the PIN code input device is correct, storing the newly inputted ID data, replacing the original ID data stored in the center storage unit; and (b7) when the number of chance flags associated with the newly inputted ID data is stored in the center storage unit, adding the number of chance flags associated with the newly inputted ID data to the initialized number of chance flags of the gaming terminal associated with the original ID data.

5. The gaming device according to claim 4, wherein the ID data input device detects that a storage medium storing the ID data is inserted or removed, and reads out and receives the ID data when the storage medium is inserted.

6. The gaming device according to claim 4, wherein each of the gaming terminal has a PIN code generation unit that generates the PIN code, wherein the ID data input device detects that a storage medium storing the ID data is inserted or removed, and reads out and receives the ID data when the storage medium is inserted, and wherein the terminal controller of each of the gaming terminals generates the PIN code by the PIN code generation unit and stores the generated PIN code in the terminal storage unit, when the storage medium is removed.

7. The gaming device according to claim 4, wherein each of the gaming terminals has a count unit that measures time, wherein the ID data input device detects that a storage medium storing the ID data is inserted or separated, and reads out and receives the ID data when the storage medium is inserted, and wherein the terminal controller of each gaming terminal causes the count unit to start time recording when the storage medium is removed from the ID data input device, when the storage medium is inserted into one of the gaming terminals in a predetermined period of time, causes the count unit to stop the measuring time, and when the storage medium is not inserted into one of the gaming terminals in a predetermined period of time, initializes the number of chance flags stored in the terminal storage unit of the gaming terminal from which the storage medium is removed.

8. The gaming device according to claim 4, wherein each of the gaming terminals has a count unit that measures time and a PIN code generation unit that generates the PIN code, wherein the ID data input device detects that a storage medium storing the ID data is inserted or removed, and reads out and receives the ID data when the storage medium is inserted, and wherein the terminal controller of each gaming terminals generates the PIN code and stores it in the terminal storage unit, and further causes the count unit to start measuring time when the storage medium is removed from the ID data input device, causes the count unit to stop measuring time when the storage medium is inserted into one of the gaming terminals in a predetermined period of time, and initializes the number of chance flags stored in the terminal storage unit of the gaming terminal from which the storage medium is removed when the storage medium is not inserted into one of the gaming terminals in a predetermined period of time.

* * * * *